United States Patent
Al-Hilali et al.

(10) Patent No.: US 8,028,239 B1
(45) Date of Patent: Sep. 27, 2011

(54) CONTEXT-BASED MANAGEMENT USER INTERFACE SUPPORTING EXTENSIBLE SUBTRACTIVE FILTERING

(75) Inventors: Hilal Al-Hilali, Seattle, WA (US); Mark Sok-Man Hong, Bothwell, WA (US); Daniel Thomas Travison, Jr., Carnation, WA (US); Jonathan Marshall Rowlett, Sammamish, WA (US); Samuel Li, Bellevue, WA (US); John Anthony Messec, Seattle, WA (US); Abhishek Gulati, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1032 days.

(21) Appl. No.: 10/742,735

(22) Filed: Dec. 19, 2003

(51) Int. Cl.
G06F 3/00 (2006.01)
G06F 3/01 (2006.01)

(52) U.S. Cl. ........ 715/762; 715/763; 715/765; 715/788; 715/825

(58) Field of Classification Search .......... 715/762–763, 715/765, 788, 825, 733
See application file for complete search history.

(56) References Cited

U.S. PATENT DOCUMENTS

| | | | | |
|---|---|---|---|---|
| 5,327,529 A * | 7/1994 | Fults et al. | ..................... | 715/762 |
| 5,335,320 A * | 8/1994 | Iwata et al. | ..................... | 717/110 |
| 5,600,778 A * | 2/1997 | Swanson et al. | ............... | 715/762 |
| 5,706,456 A * | 1/1998 | Dupper et al. | ................ | 715/839 |
| 6,086,618 A | 7/2000 | Al-Hilali et al. | | |
| 6,476,828 B1 * | 11/2002 | Burkett et al. | ................ | 715/760 |
| 6,484,276 B1 * | 11/2002 | Singh et al. | ..................... | 714/41 |
| 6,973,626 B1 * | 12/2005 | Lahti et al. | ..................... | 715/763 |
| 7,032,183 B2 * | 4/2006 | Durham | ........................ | 715/823 |
| 7,120,874 B2 * | 10/2006 | Shah et al. | ..................... | 715/733 |
| 7,222,369 B2 * | 5/2007 | Vering et al. | ..................... | 726/28 |
| 2001/0039514 A1 * | 11/2001 | Barenbaum et al. | ............ | 705/14 |
| 2002/0087591 A1 * | 7/2002 | Reynar et al. | .................. | 707/500 |
| 2003/0105770 A1 | 6/2003 | MacLeod et al. | | |
| 2004/0019628 A1 * | 1/2004 | Puri et al. | ...................... | 709/203 |
| 2004/0031059 A1 * | 2/2004 | Bialk et al. | ..................... | 725/129 |
| 2005/0010894 A1 * | 1/2005 | Potter et al. | .................... | 717/104 |

OTHER PUBLICATIONS

*Microsoft® Management Console Design and Development Kit*, pp. i-829 (and CD-Rom), Copyright © by Microsoft Corporation, 2000.
"How To: Create Custom MMC Snap-in Tools Using Microsoft Management Console, Microsoft Knowledge Base Article—230263," http://support.microsoft.com/?kbid=230263, 3 pages, website visited on Nov. 4, 2003.
"JFace: UI Framework for Plug-ins," http://help.eclipse.org/help20/content/help:/org.eclipse.platform.doc.isv/guide/jface.htm, 1 page, website visited on Nov. 4, 2003.

(Continued)

*Primary Examiner* — Nicholas Augustine
(74) *Attorney, Agent, or Firm* — Klarquist Sparkman, LLP

(57) ABSTRACT

A management user interface can be generated at run time via subtractive extensible context-based filtering. Definitions of user interface elements can include an indication of appropriate contexts for which the user interface elements are to be shown. Context factors can include application state, external state, surface or element definitions, or some combination thereof. The context-based filtering approach allows definition of user interface elements and user interface surfaces so that appearance of additional elements in the appropriate surfaces can be accomplished without programming. For example, a user interface surface definition can specify categories of user interface elements. At run time, those user interface elements of the category can be chosen for display. When new elements relating to the category are added, the new elements appear when the surface is rendered. Other features include heterogeneous type selection and exact number homogeneous type selection.

35 Claims, 23 Drawing Sheets

OTHER PUBLICATIONS

"Microsoft Management Console: Overview," http:/www.microsoft.com/windows2000/techinfo/howitworks/management/mmcover.asp, 2 pages, website visited on Dec. 12, 2003.

"Microsoft Management Console: Overview—White Paper," Microsoft Corporation, 59 pages, 1999.

"Microsoft Management Console: MMC," PowerPoint Presentation, http://www.microsoft.com/windows2000/docs/MMC_12_Presentation.ppt, 16 pages, website visited on Nov. 4, 2003.

"MMC—Microsoft Management Console, The Elder Geek on Windows XP," http://www.theeldergeek.com/microsoft_management_console.htm, 10 pages, website visited on Nov. 4, 2003.

"Namespace Extensions (Windows Explorer and Controls," http://msdn.microsoft.com/library/en-us/shellcc/platform/shell/programmersguide/shell_adv/namespaceextension/nse_works.asp, 4 pages, website visited on Dec. 15, 2003.

Bennion, "Tools for Managing AD Delegation," http://www.winnetmag.com/Article/ArticleID/25641/25641.html, 2 pages, website visited on Nov. 4, 2003.

Bennion, "AD Delegation: Beyond the Basics," http://www.winnetmag.com/Windows/Article/ArticleID/25640/25640.html, 3 pages, website visited on Nov. 4, 2003.

Emmenis, "Using the Eclipse GUI Outside the Eclipse Workbench, Part 1: Using JFace and SWT in Stand-Alone Mode," http://www-106.ibm.com/developerworks/java/library/os-ecgui1/, 17 pages, website visited on Nov. 4, 2003.

Klinger, "Creating JFace Wizards," http://www.eclipse.org/articles/Article-JFace%20Wizards/wizardArticle.html, 15 pages, website visited on Nov. 14, 2003.

Rubinstein, "Programming the X Window System in Linux, Part 1," http://www.interex.org/pubcontent/enterprise/may01/08rubin.html, 9 pages, website visited on Dec. 15, 2003.

* cited by examiner

CONTEXT-BASED MANAGEMENT USER INTERFACE SUPPORTING EXTENSIBLE SUBTRACTIVE FILTERING

TECHNICAL FIELD

The technical field relates generally to generation of user interfaces for computer software, such as software for managing network resources.

BACKGROUND

User interfaces are an integral part of computer software. In fact, the quality of software is often reflected by the quality of its user interface. So, software developers pay careful attention to designing a user interface that arranges elements for easy, logical invocation of the software's functionality. The software is then shipped to the customer for use.

However, despite the great attention paid to developing the best possible user interface, a customer almost inevitably finds that the user interface does not quite fit the customer's needs. For example, although the user interface is easy to use, it may be too permissive in that it allows users to access more functionality than the customer wishes. Such can be the case when a system administrator determines that a feature should not be available to most users or perhaps not available at all.

In other cases, the customer may wish to extend the functionality of the software by adding additional modules or plugins. Such modules or plugins may require additional user interface elements for interaction with the user. However, the customer may not be able to reprogram the user interface or may not wish to become involved in redesigning the user interface to accommodate new features.

Accordingly, some software allows customization of user interfaces by addition of buttons or menu items. However, typical approaches are static in nature and often fall short of customer needs. There still exists a need for improved techniques for managing, designing, creating, generating, and presenting user interfaces for software.

SUMMARY

Various technologies can be used for context-based generation of user interfaces for software. For example, a context mechanism can be used to determine which user interface elements are appropriate for presentation.

A user interface can be easily customized to particular situations by specifying any of a variety of context factors. For example, a management element definition can include metadata specifying the appropriate contexts for which an associated user interface element is to be chosen for display. At run time, if the current context is appropriate, the associated user interface element is chosen for display.

If new functionality is desired, appropriate management elements can be added to the management element definitions. New user interface elements will be presented even if they were not anticipated at the time the software was designed or shipped. Also, new user interface surface definitions can be added to extend or otherwise modify the user interface. The user interface surface definitions can result in display of both old and new user interface elements.

Choosing which user interface elements to present can be accomplished by subtractive filtering. Filters are extensible in that new filters can be added after the software is shipped, and the filters can filter based on context factors external to the software.

A variety of other features can be supported, including heterogeneous types, exact number homogenous types, or some combination thereof in the current context.

The foregoing and other features and advantages will become more apparent from the following detailed description of disclosed embodiments, which proceeds with reference to the accompanying drawings.

DETAILED DESCRIPTION OF EXEMPLARY EMBODIMENTS

Example 1

Exemplary Overview

The technologies described herein can be applied to a variety of scenarios for generating user interfaces. For example, various management user interfaces can be generated to provide a user with helpful user interfaces for performing management tasks. Such management user interfaces can be used to manage any of a variety of resources, such as system, network, or other resources.

Example 2

Exemplary User Interface Surface

Figure 1:
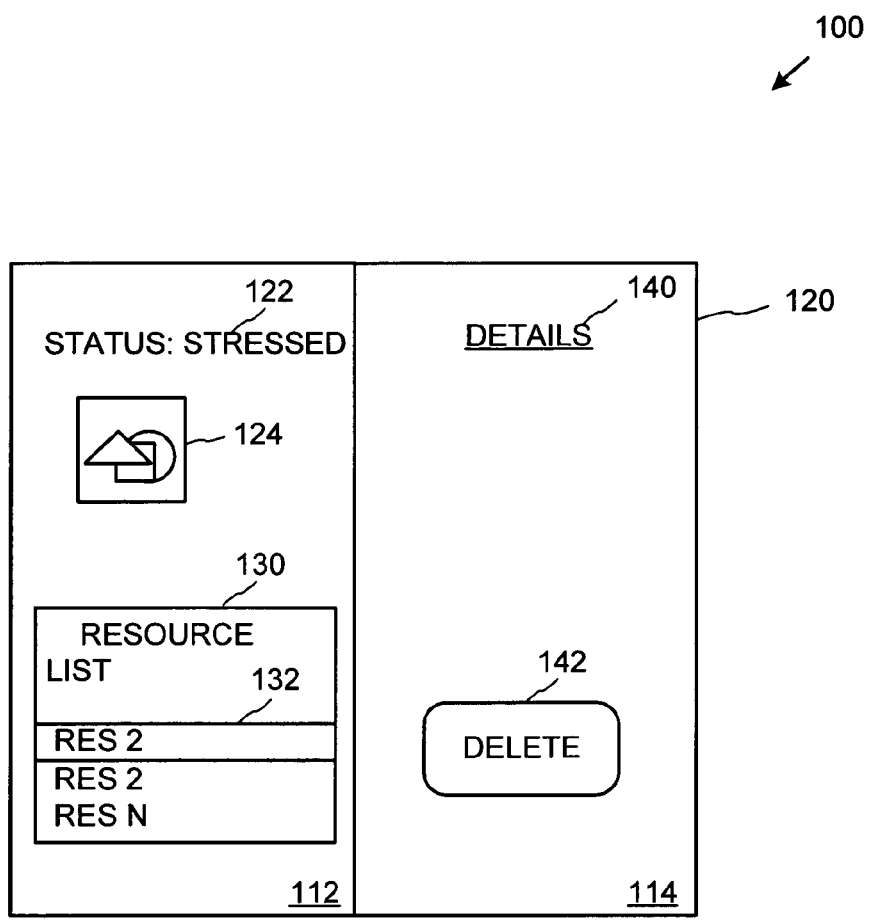
FIG. 1 is a screen shot showing an exemplary user interface surface generated via the technologies described herein.

FIG. 1 shows an exemplary user interface surface 100 that can be generated via the technologies described herein. In the example, the user interface surface 100 takes the form of a rectangular window 120, although other shapes can be supported.

The user interface surface 100 can include one or more panes 112 and 114, which are sometimes called "zones." Within the exemplary zones 112 and 114 are various exemplary user interface elements, such as an informational display 122, a graphic 124, a list 130 having a selected list element 132, a link 140, and a button 142. In any of the examples herein, any number of other user interface elements can be used, such as radio buttons, check boxes, fields, scroll bars, menus, button bars, drop down boxes, combo boxes, thermometers, sliders, and the like.

Further, although not shown, windows can also include other elements, such as a title bar, resizing handles, a close box, and the like.

Example 3

Exemplary Context

The technologies described herein can use a current context to choose which user interface elements are to be displayed. The current context can indicate a variety of factors related to a particular situation and can be determined from a variety of sources. For example, as described herein, application state (e.g., user selections), the type of a management item (e.g., whether the management item is selected or implicit), a category or other factor specified in a user interface surface definition, external factors (e.g., the role of the current user), other similar factors, or some combination thereof can make up the current context.

Example 4

Exemplary Architecture for Subtractive Context-Based Filtering

Figure 2:
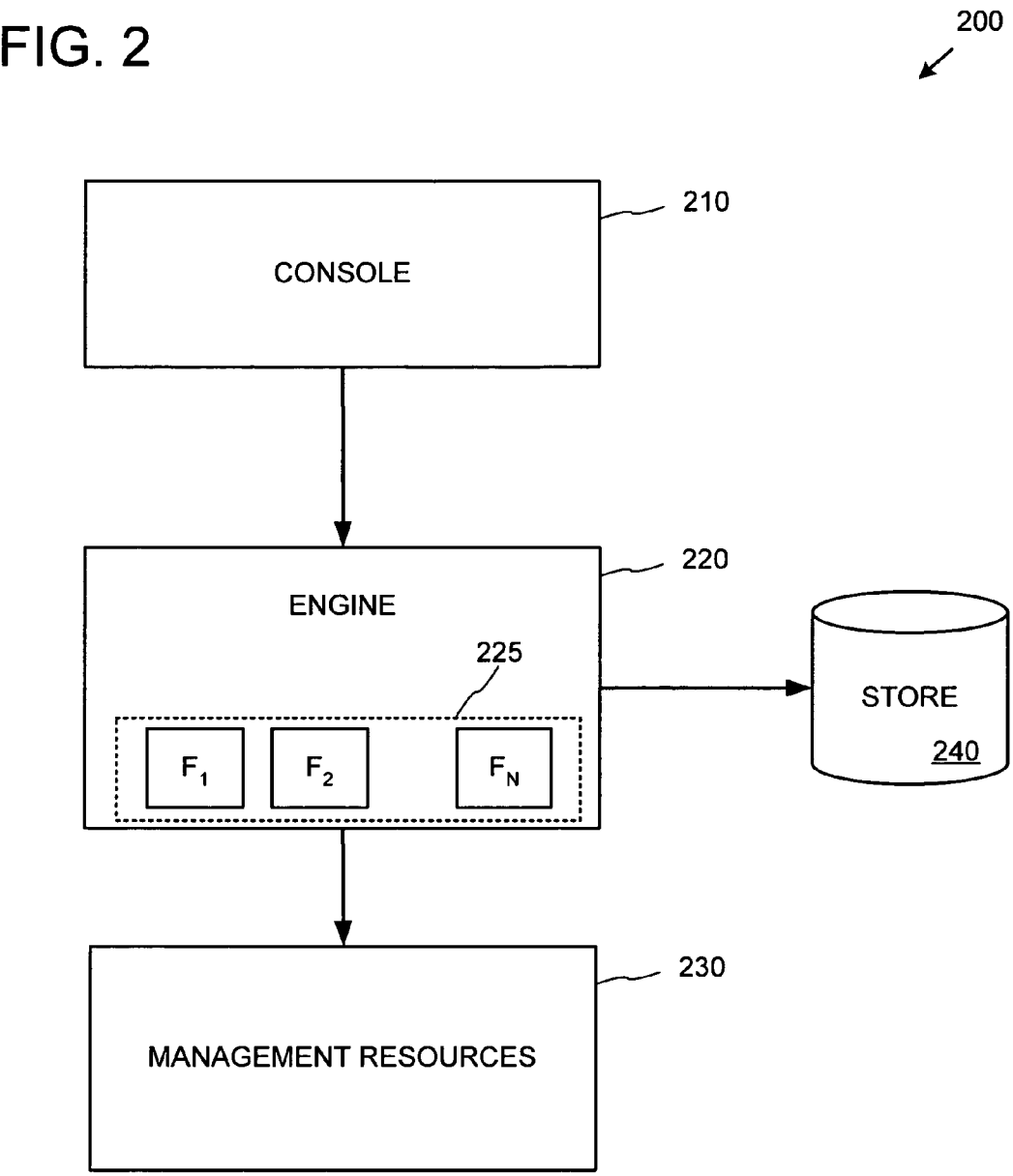
FIG. 2 is a block diagram showing an exemplary architecture for performing subtractive context-based filtering for presentation of a user interface.

FIG. 2 shows an exemplary system 200 for presenting a user interface via subtractive context-based filtering. In the example, a console user interface 210 is presented as an application by choosing user interface element definitions in a store 240 with a runtime engine 220.

The engine 220 can make use of one or more subtractive filters 225, which can filter based on a current context. The filters can rely on context factors external to the system 200. Based on user selections of tasks to be performed, the engine can send appropriate commands (e.g., to a shell) for management of the management resources 230.

The filters 225 can come from a variety of sources. Some filters can be shipped with the software system 200. However, additional filters can be registered as new filters for the system 225 after the software system 200 is shipped. Additionally, filters can be associated with particular user interface surface definitions, including those added after the software system 200 is shipped.

Example 5

Exemplary User Interface and Management Element Definitions

Figure 3A:
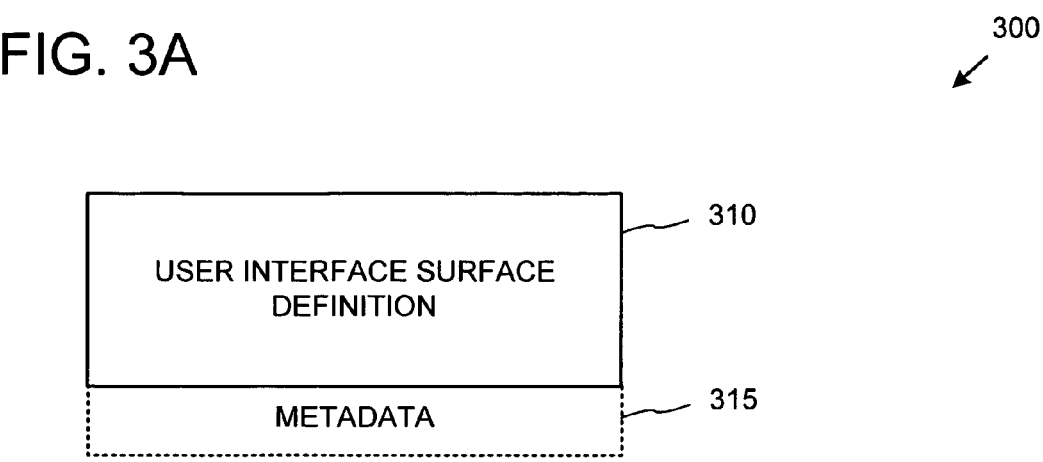
FIG. 3A is a block diagram showing exemplary metadata associated with a user interface surface definition.

FIG. 3A shows an exemplary arrangement 300 for associating metadata 315 with a user interface surface definition 315. In the example, the metadata 315 can include indications of context factors to be added to the current context (e.g., for consideration by a filter). In some cases, a filter can also be associated with the user interface surface definition 310.

Figure 3B:
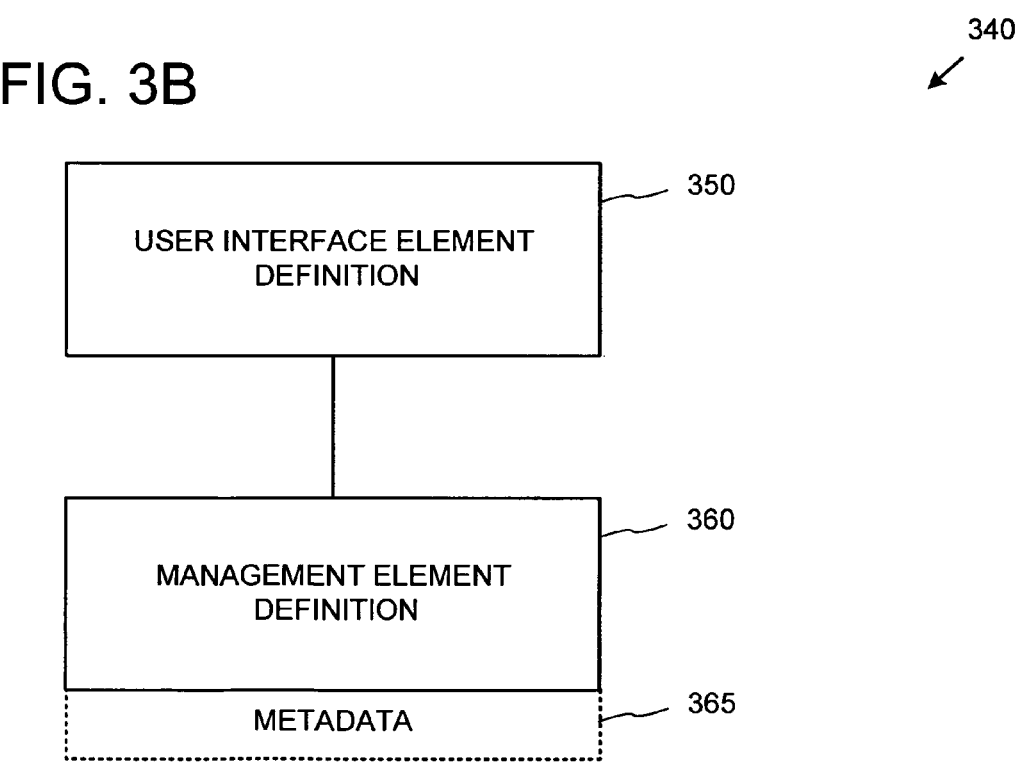
FIG. 3B is a block diagram showing exemplary metadata associated with a management element definition, which is associated with a user interface element definition.

FIG. 3B shows an exemplary arrangement 340 for associating metadata 365 with a management element definition 360, which is loosely-coupled to a user interface element definition 350. In the example, the user interface element definition 350 and the management element definition 360 can communicate to facilitate separate processing. For example, an engine can filter management element definitions and submit the associated user interface element definitions to a user interface presenter. In this way, the engine need not contain user interface element definition processing (e.g., rendering) functionality. The management element definition 360 can include the logic behind the user interface element definition 350. For example, the management element definition 360 can include logic for retrieving data to be displayed, and logic for initiating execution of a selected task (e.g., with parameters, if any, when the user interface element is activated).

The metadata 365 can include indications of context factors to be added to the current context. Additionally, the metadata 365 can indicate for which contexts the associated user interface element is to be shown. For example, the metadata can indicate the type of items the user interface element accepts as input. A filter can then cause the associated user interface element to be removed from display (e.g., by filtering out the management element) unless the specified type is selected by a user. Or, the metadata can indicate for which user roles the user interface element is to be shown. A filter can then cause the user interface element to be removed from display unless the current user is of one of the specified roles.

Metadata can be associated with definitions in a variety of ways. For example, the metadata can be stored in a store (e.g., the store 240 of FIG. 2) and associated with an identifier of a definition. The metadata can be edited (e.g., after the software ships) by an administrator having sufficient rights to provide for customization of the system. Similarly, the associated definitions themselves can be stored in the store. New definitions can be added (e.g., after the software ships) by an administrator to further customize the system.

Example 6

Exemplary Method for Context-Based Filtering

Figure 4:
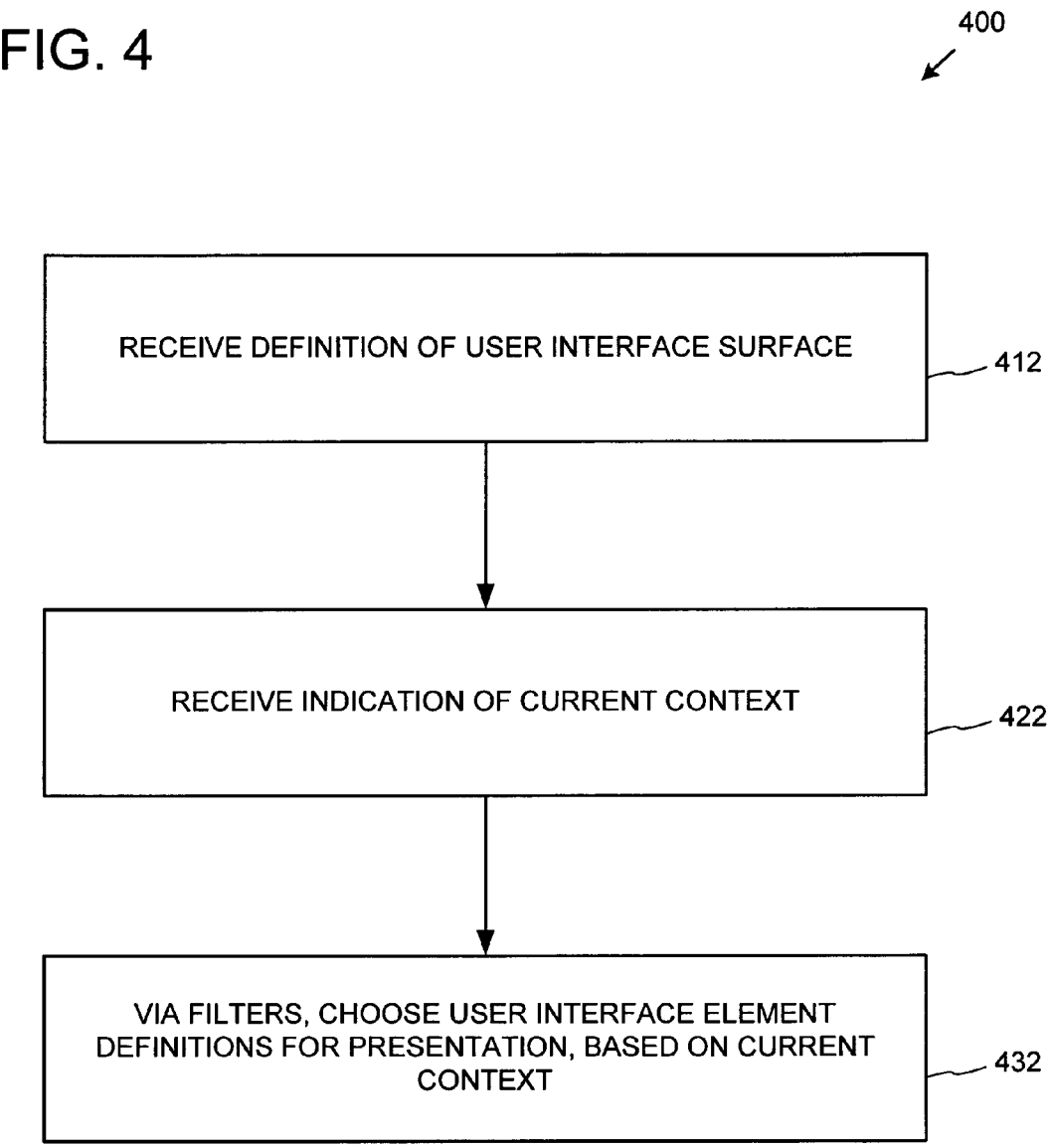
FIG. 4 is a flowchart showing an exemplary method for performing filtering based on a current context.

FIG. 4 shows an exemplary method 400 for performing context-based filtering (e.g., by the system 200 of FIG. 2). In the example, a definition of a user interface surface is received at 412. At 422, an indication of the current context (e.g., a plurality of context factors and associated values) are received. Then, at 432, via the filters, user interface element definitions for presentation are chosen (e.g., by the engine 220 of FIG. 2), based on the current context.

Example 7

Exemplary System Supporting Contexts

Figure 5:
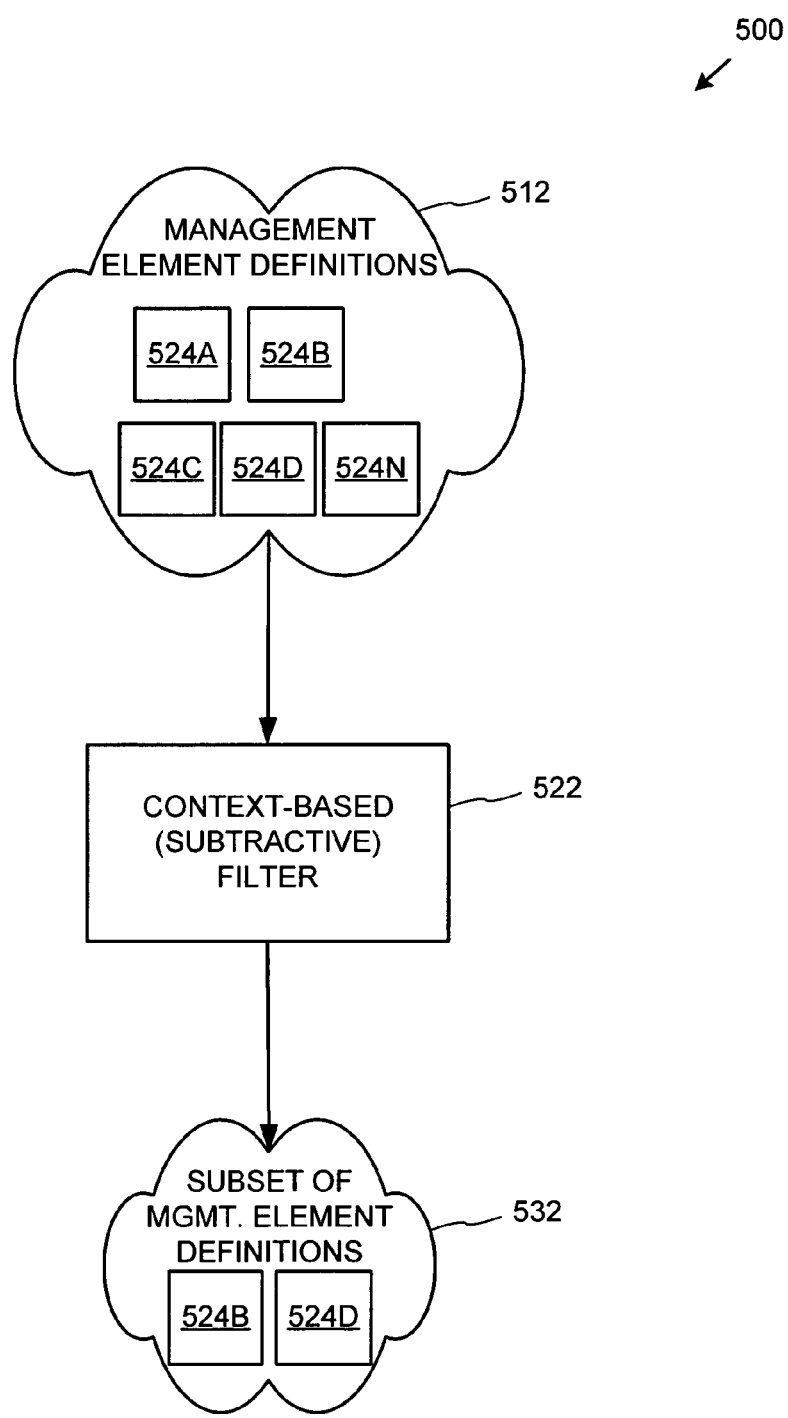
FIG. 5 is a block diagram showing an exemplary system supporting context-based management element filtering.

FIG. 5 shows an exemplary system 500 supporting context-based user interface element filtering. In the example, the system 500 includes a set of a plurality of management elements definitions 512 (e.g., the definitions 524A-524N), which can be associated with metadata and any of a variety of user interface element definitions.

A context-based filter 522 can apply a subtractive filtering technique to the management element definitions 512 to generate a subset 532 of the management element definitions. For example, the filter 522 can remove the management element definitions 512 based on application state (e.g., user selection), external context factors, or any other context factor contributed to the current context.

Typically, as more context factors are added to the current context, the number of definitions in the subset decreases. However, there are scenarios in which adding a context factor to the current context will not affect the subset 532 or increases its size.

Example 8

Exemplary Method for Context-based User Interface Element Filtering

Figure 6:
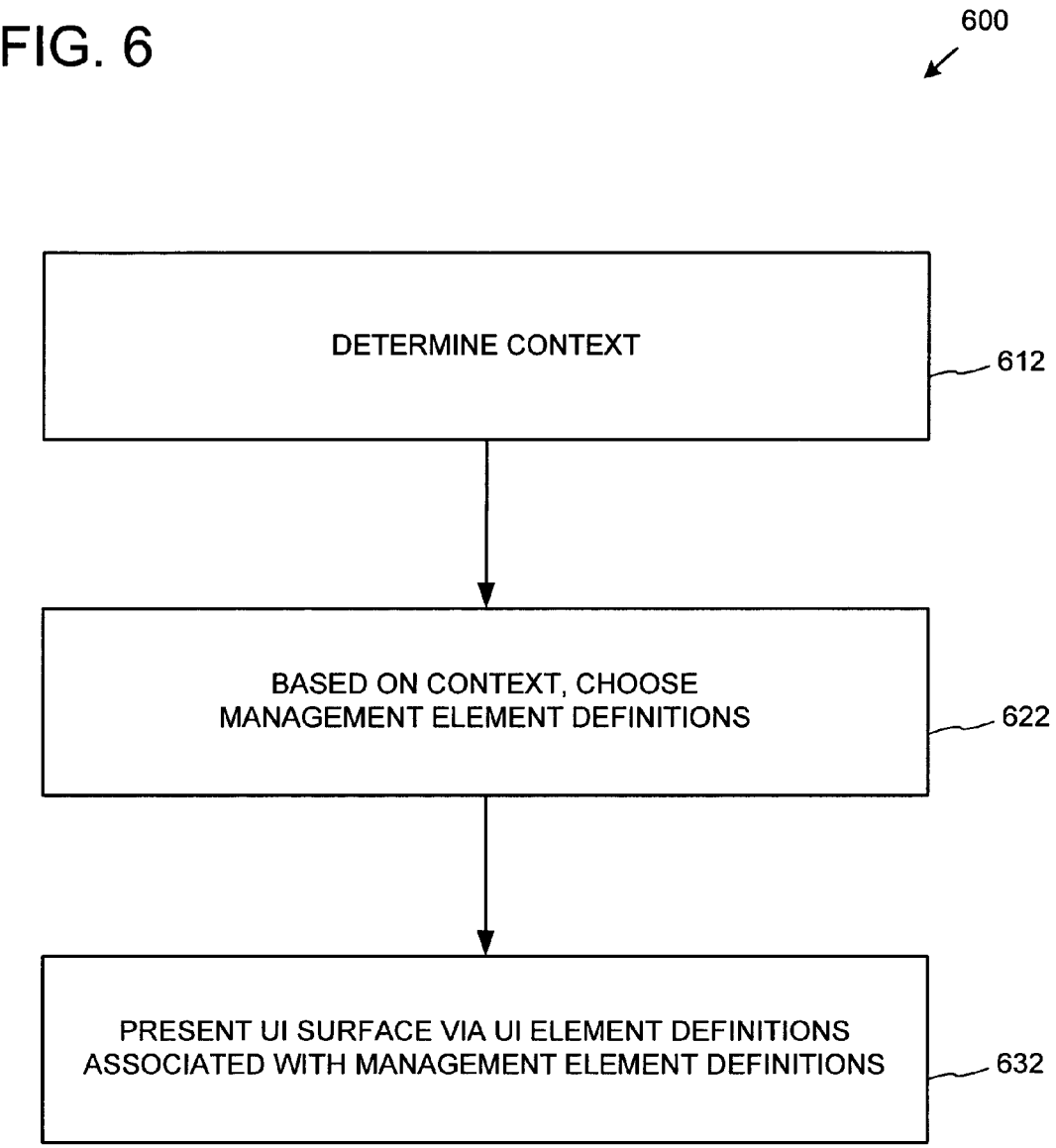
FIG. 6 is a flowchart showing an exemplary method for achieving context-based management element filtering.

FIG. 6 shows an exemplary method 600 for achieving context-based user interface element filtering. For example, the method 600 can be implemented by the system 500 of FIG. 5.

At 612, a current context is determined. As described herein, the context can include one or more context factors and can indicate a current situation (e.g., based on internal factors, external factors, or both).

At 622, based on the current context, management element definitions are chosen based on the current context.

At 632, a user interface surface is presented via the user interface element definitions associated with the chosen management elements. Although not shown, the method can also include receiving a definition of the user interface surface, which can also contribute to the current context.

In some cases, it may be desirable to have the actions shown in the method 600 performed by more than one piece of software. For example, it may be desirable to have the user interface presented by a different piece of software (e.g., a front end) to decouple the user interface from the underlying system.

Example 9

Exemplary System Supporting Subtractive Filtering

Figure 7:
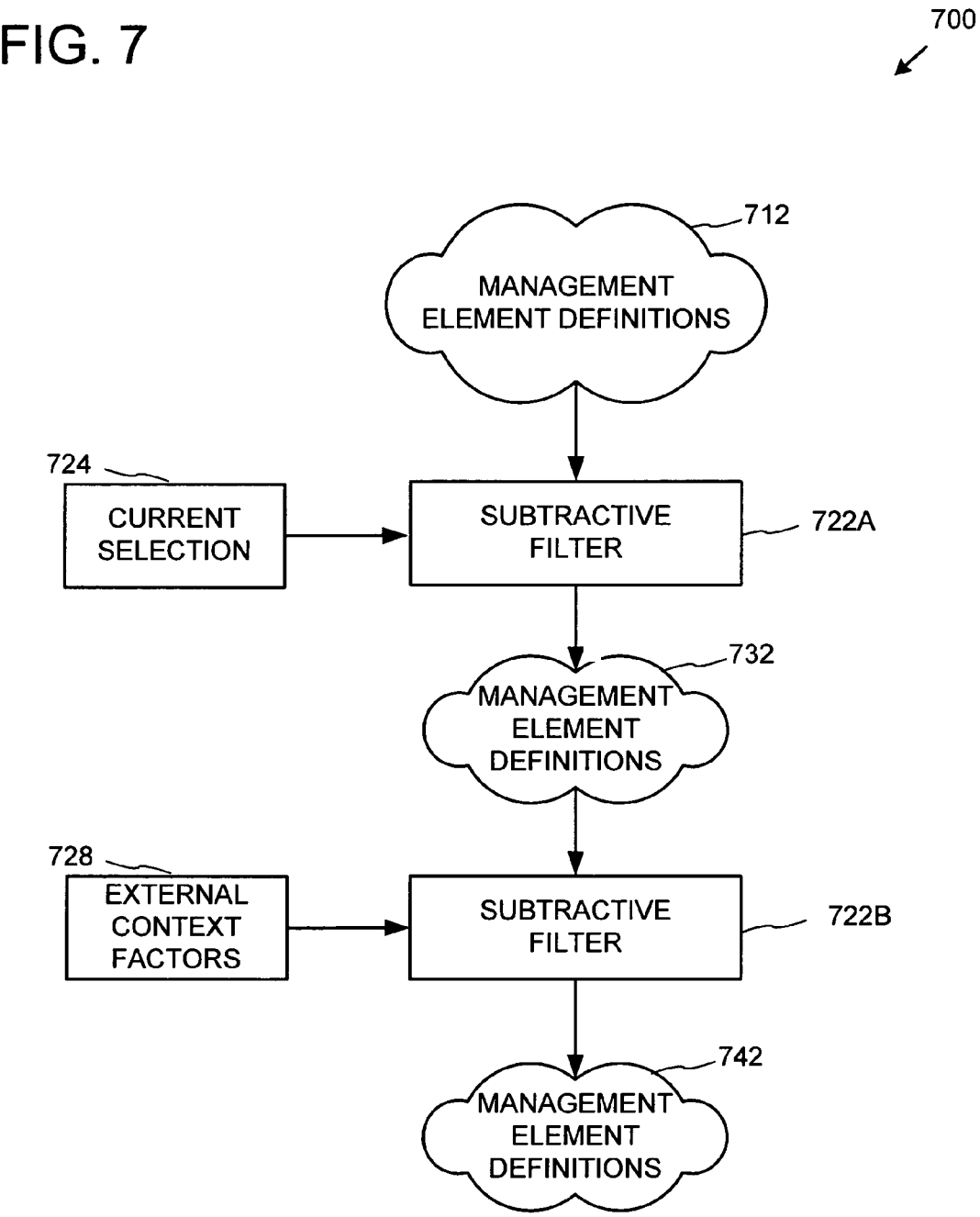
FIG. 7 is a block diagram showing an exemplary system supporting context-based management element filtering via subtractive filtering.

FIG. 7 shows an exemplary system 700 supporting context-based subtractive filtering. In the example, the system 700 includes a set of a plurality of management elements definitions 712 (e.g., the definitions 524A-524N of FIG. 5), which can be associated with metadata and any of a variety of user interface element definitions.

A subtractive (e.g., context-based) filter 722A can apply a subtractive filtering technique to the management element definitions 712, resulting in a subset 732 of the management element definitions. For example, the filter 722A can remove the management element definitions 512 based on application state, or any other context factor contributed to the current context. In the example, the filter 722A can rely on the current selection 724 when filtering (e.g., to remove those elements taking as input a management item of a particular type when no such management item is selected).

A second filter 722B can further apply a subtractive filtering technique to further limit the definitions to a subset 742 of the definitions 732. For example, the filter 722B can rely on external context factors 728 (e.g., a user role).

Additional filters can be employed, and the system 700 can support filter extensibility. Additional filters can be added after the software for performing the subtractive filtering by registering the filters with the software after the software is shipped.

Again, typically, as more context factors are added to the current context, the number of definitions in the subset decreases. However, there are scenarios in which adding a context factor to the current context will not affect the subsets or increases their size.

Example 10

Figure 8:
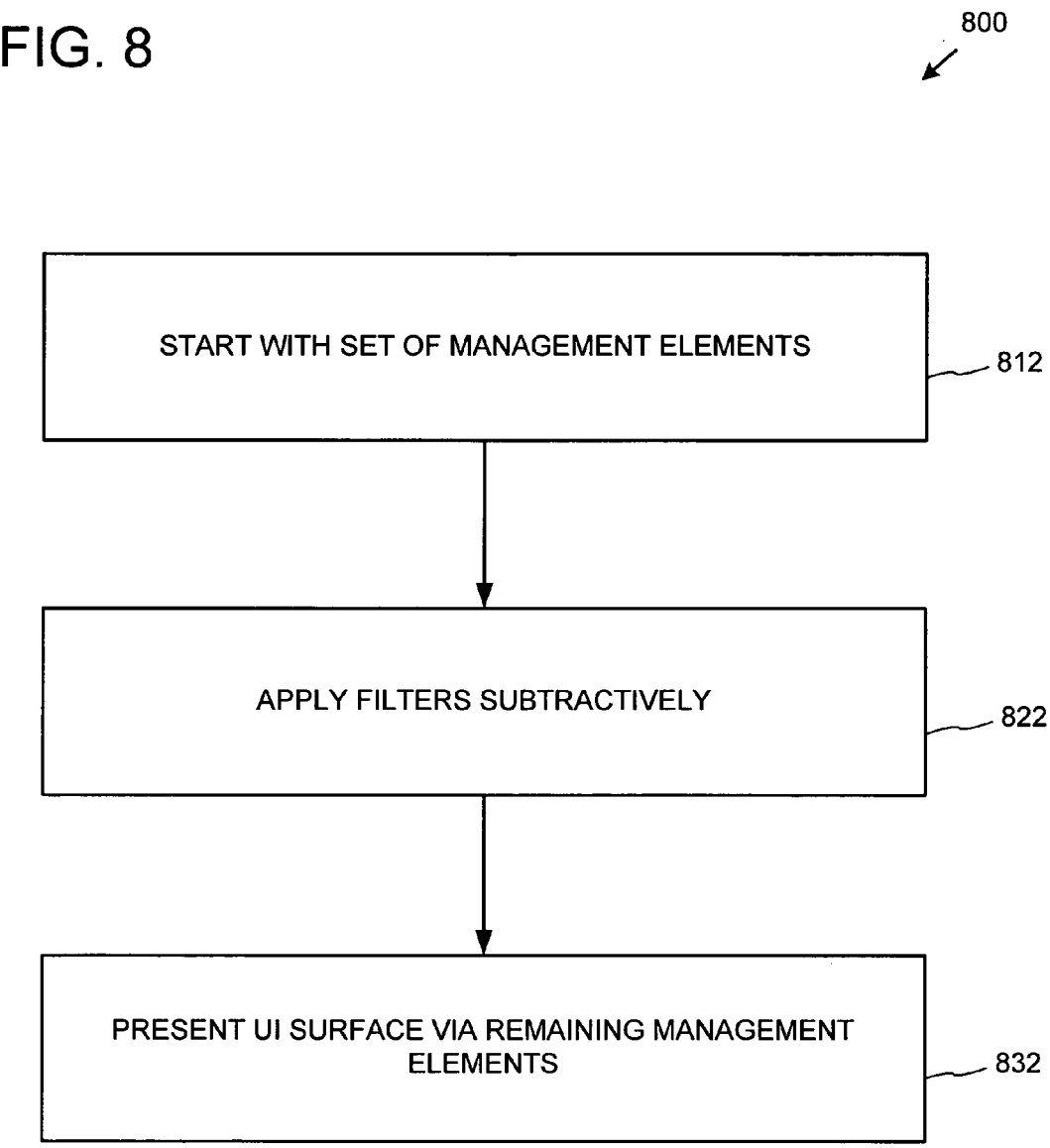
FIG. 8 is a flowchart showing an exemplary method for achieving subtractive context-based management element filtering.

Exemplary Method for Subtractive Context-based User Interface Element Filtering FIG. 8 shows an exemplary method 800 for achieving subtractive context-based user interface element filtering. For example, the method 800 can be implemented by the system 700 of FIG. 7.

At 812, the method starts with a set of management element definitions. For example, the entire set of management element definitions can be used as a starting point.

At 822, one or more filters are applied subtractively to the set of management element definitions. For example, management element definitions can be filtered based on the current context.

At 832, a user interface surface is presented via the user interface element definitions associated with the remaining management elements. Although not shown, the method can also include receiving a definition of the user interface surface, which can also contribute to the current context.

Again, it may be desirable to have the user interface presented by a different piece of software (e.g., a front end) to decouple the user interface from the underlying system.

Example 11

Exemplary Context Factor Sources

Figure 9:
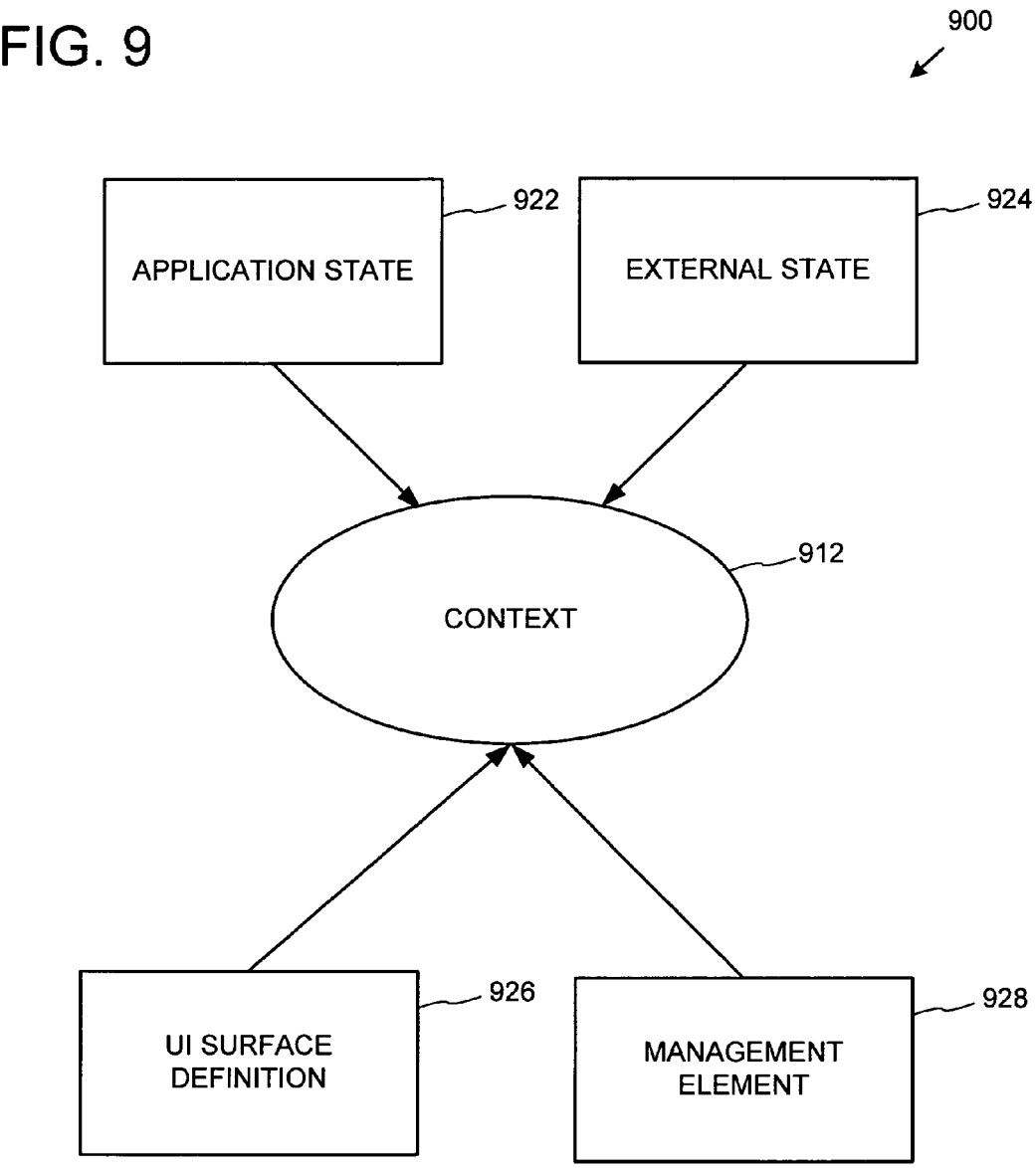
FIG. 9 is a block diagram showing exemplary sources contributing context factors to a current context.

FIG. 9 shows exemplary sources 900 contributing context factors to a current context 912. In the example, application state 922 can contribute one or more context factors to the current context. For example, user selections from the user interface (e.g., user interface elements selected by a user via clicking or the like) can contribute one or more context factors to the current context. Also, external state 924 can contribute one or more context factors to the current context. For example, the software or additions to the software (e.g., added filters) can execute arbitrary code to retrieve information and contribute it to the context or use it for filtering. For example, a user role of a current user can be contributed to the current context. Or, system or network conditions can contribute to the current context.

Further, a user interface surface definition 926 can contribute one or more context factors to the current context. For example, context can be implicit if defined by the user interface surface definition to indicate the current item being processed (e.g., a server) even if such an item is not selected by a user. Further, the definition can include zone definitions, which can also contribute to the current context to assist in visual separation of different categories of user interface elements.

Still further, management elements 928 can contribute one or more context factors to the current context. For example, a management element may add any arbitrary context factor based on its definition or indicate application state.

Example 12

Exemplary Context Factors

The context factors supported by the system can be extended without limit. For example, factors related to the application's status, a user role (e.g., Active Directory role), current user, user selections, managed item status, implicit selection, zone category, count of objects in a list, types of objects, absence of objects, whether an item is enabled or disabled, any external factor, the time of day, the phase of the moon, disk capacity, group policies, whether an Internet connection is available, whether an item is a member of a cluster, whether a server is online or offline, and the like can be supported.

Additional context factors can be added after the software system is shipped. New filters can be added to filter on current or added context factors. New management items and user interface surface definitions can contribute current or added context factors.

Example 13

Exemplary Customization

Figure 10:
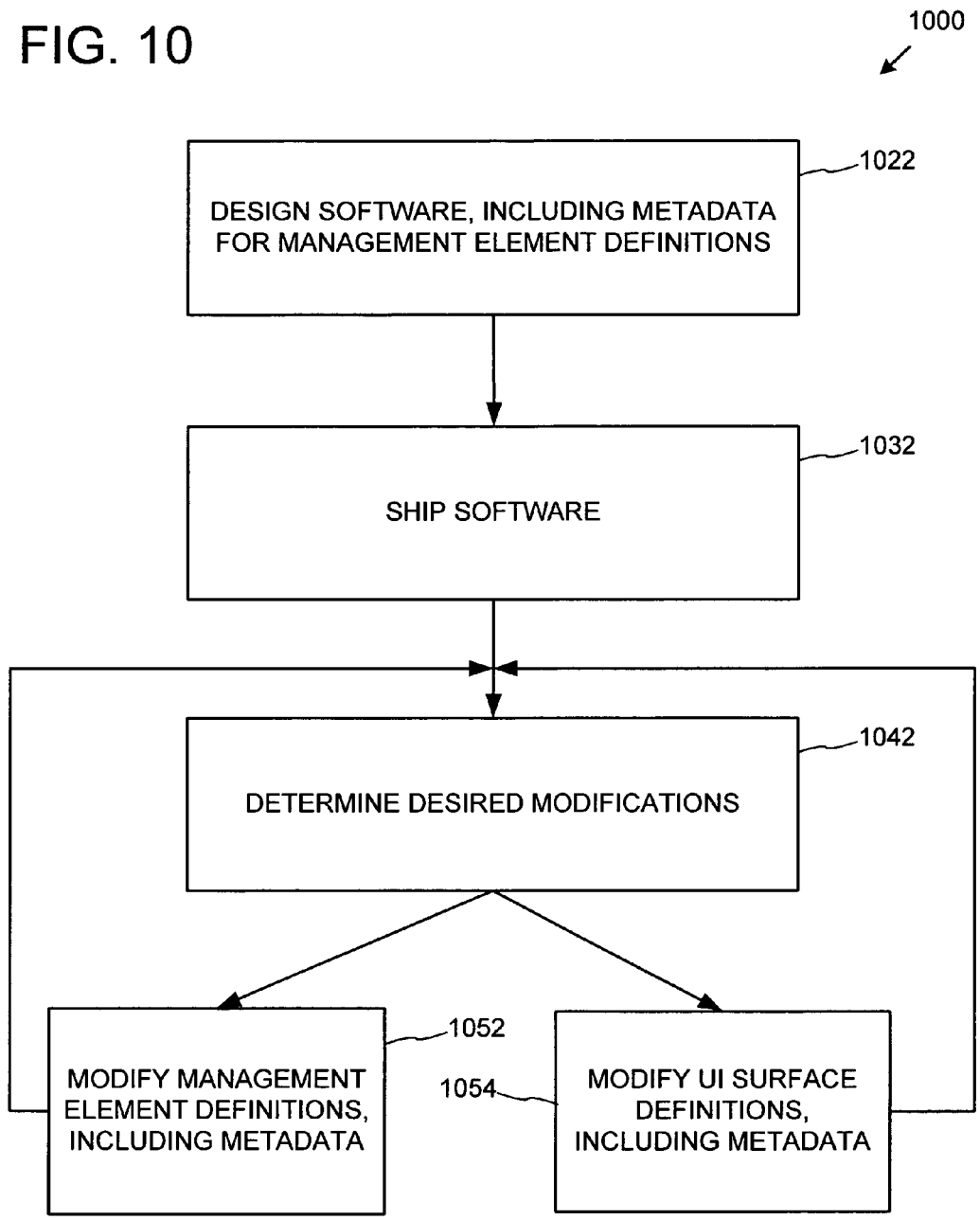
FIG. 10 is a flowchart showing an exemplary process for customizing software supporting context-based management element filtering.

FIG. 10 shows an exemplary process by which software supporting context-based user interface element filtering can be customized.

At 1022, the software is designed and includes metadata for management element definitions; the metadata can be used for subtractive filtering. At 1032, the software is shipped.

As is very often the case, at 1042, desired modifications for the software are determined after the software is shipped. A determination of desired modifications can be made by the shipper, the customer, or a third party. Such modifications can be accomplished via modifying (e.g., adding, deleting, or changing) management element definitions and user interface element definitions, including associated metadata (e.g., indicating when the respective user interface elements are to be displayed) 1052 or modifying user interface surface definitions, including indications of context for the user interface surface definitions (e.g., indicating when user interface elements are to be displayed in the respective user interface surface definitions) 1054. The process can be repeated as desired.

The actions shown in the process can be performed by different actors. For example, the software can be shipped by one party, and other parties can develop user interface element definitions, user interface surface definitions, modifications thereto, or some combination thereof. A developer may specialize in developing user interface element definitions and market them as a package to extend or enhance the shipped software. User interface surface definitions can likewise be included.

Or, if an administrator of the system wishes to modify the software after shipping 1032, modifications can be accomplished via the administrator rather than relying on a third party. Or, third party modifications can be incorporated in combination with administrator modifications.

Figure 11:
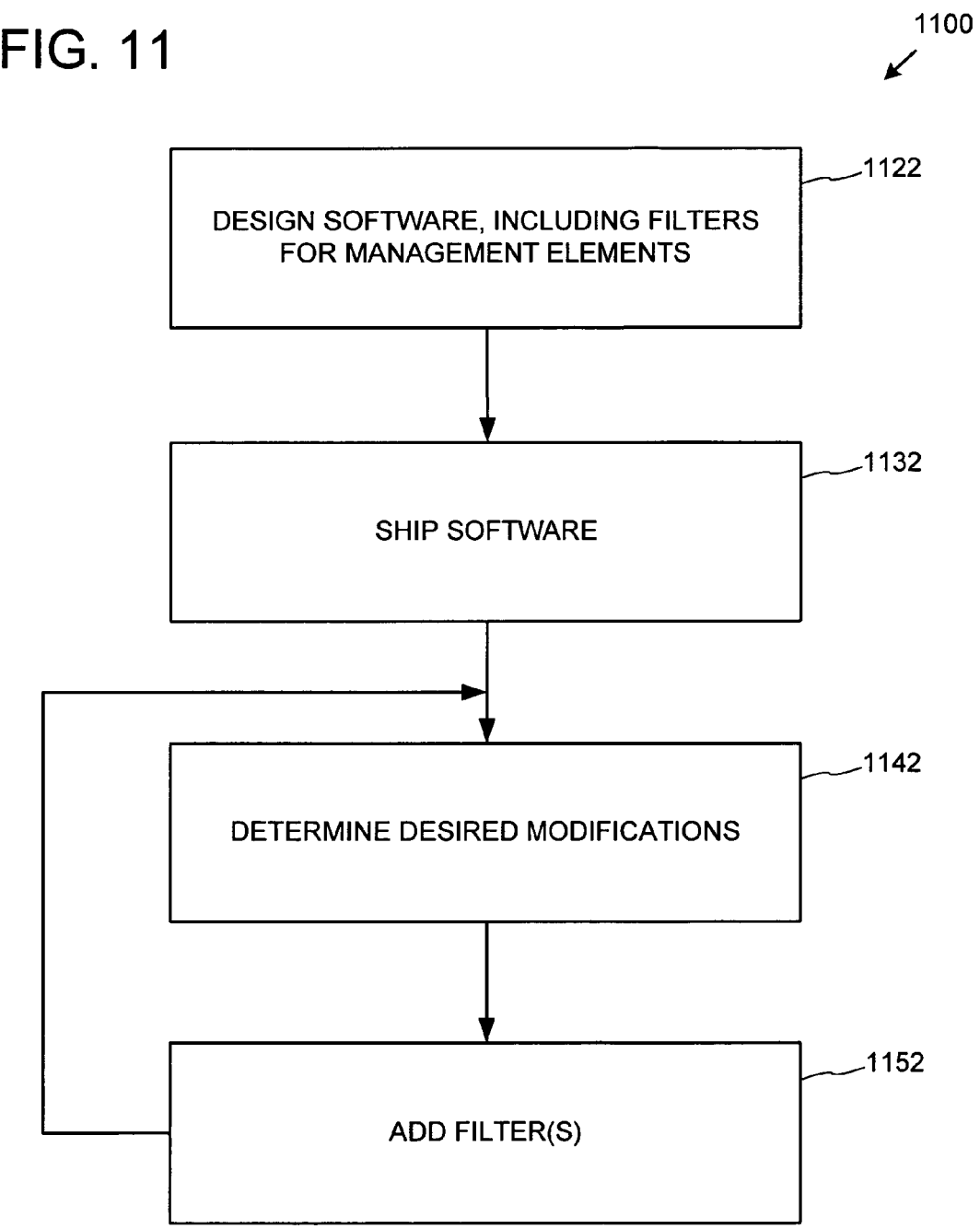
FIG. 11 is a flowchart showing an exemplary process for customizing software supporting extensible filtering.

Further, the filters are extensible as shown by the process in FIG. 11, which can also be supported by the same software supporting the process of FIG. 10. At 1122, the software is designed, including filters for the management element definitions. At 1132, the software is shipped. After shipping, desired modifications are determined. One or more filters can be added at 1152, which can be repeated as needed and in concert with 1052 and 1054 of FIG. 10. Filters can be added by registering them with the software.

Figure 12:
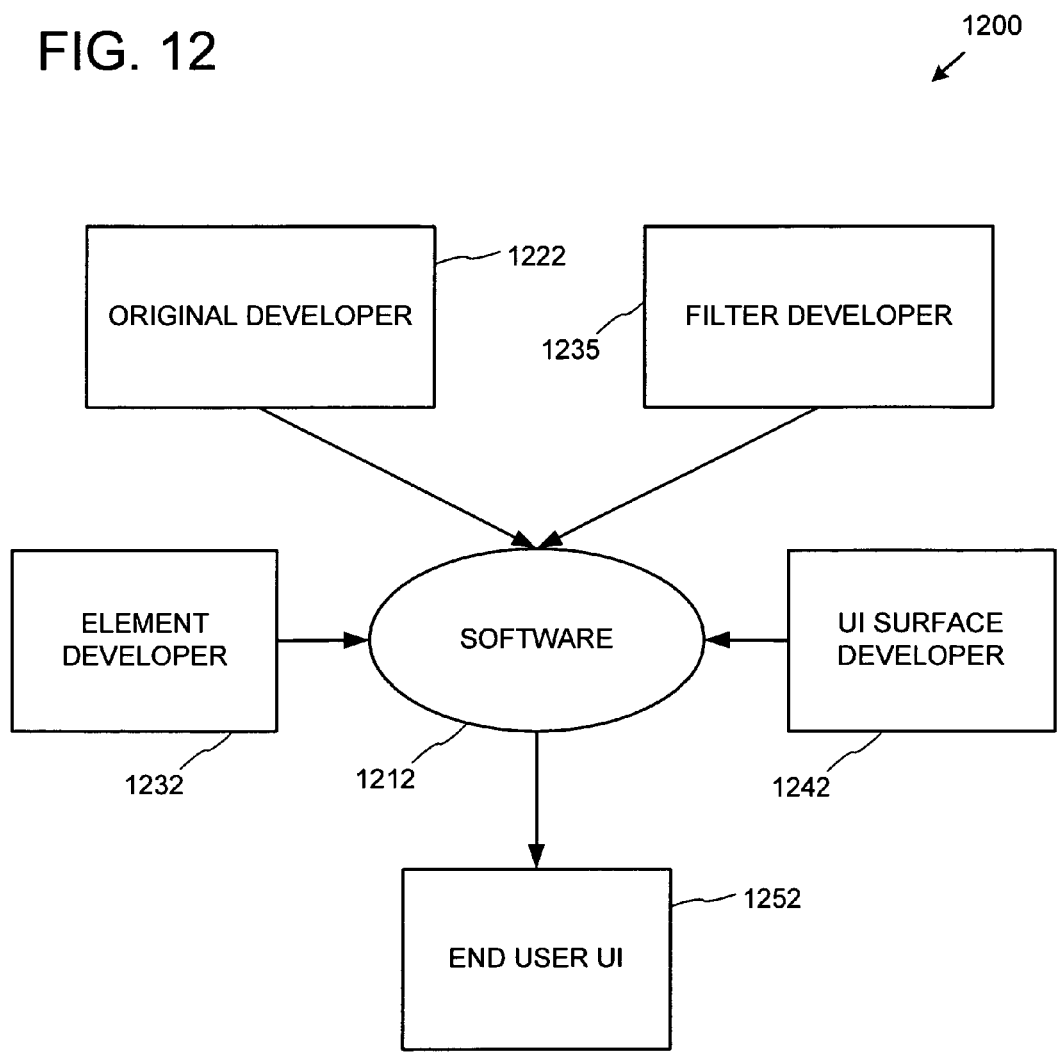
FIG. 12 is a block diagram showing exemplary contributors to software supporting context-based management element filtering for a user interface for an end user.

FIG. 12 shows exemplary contributors 1200 to software 1212 supporting context-based user interface element filtering. In the example, an original developer 1222, an element (e.g., user interface element, management element, or both) developer 1232, a filter developer 1235, and a user interface surface developer 1242 contribute to the software 1212, which generates a user interface 1252 for an end user. The developers shown may be different parties or the same party as desired.

Any of the contributors can contribute new management element definitions, new user interface definitions, user interface surface definitions, new filters, or some combination thereof. Further, a party may achieve user interface goals by simply combining existing definitions in a new way, modifying associated metadata, or some combination thereof.

Example 14

Exemplary User Interface Customization without Programming

Figure 13:
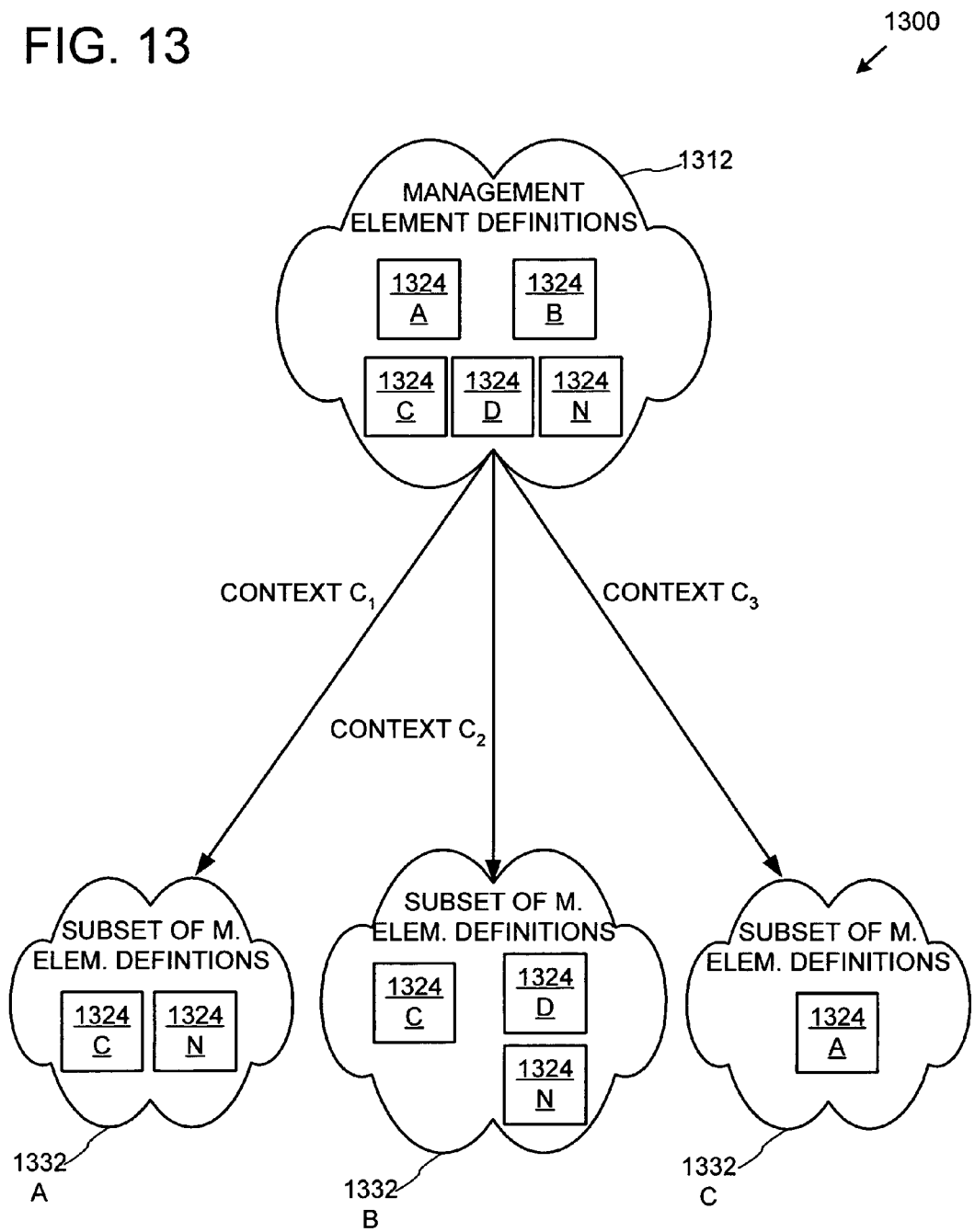
FIG. 13 is a block diagram showing exemplary management element filtering based on context.

FIG. 13 shows an arrangement 1300 employing context-based management element filtering. The example includes a set of management element definitions 1312 (e.g., definitions 1324A-1324N). Depending on the context, different subsets of the definitions 1312 are selected. For example, for a first context, the subset 1332A (e.g., definitions 1324C and 1324N) is chosen. For a second context, the subset 1332B (e.g., definitions 1324C, 1324D, and 1324N) is chosen. For a third context, the subset 1332C (e.g., the definition 1324A) is chosen. The subsets can be chosen at runtime of the software presenting the associated user interface elements.

Figure 14:
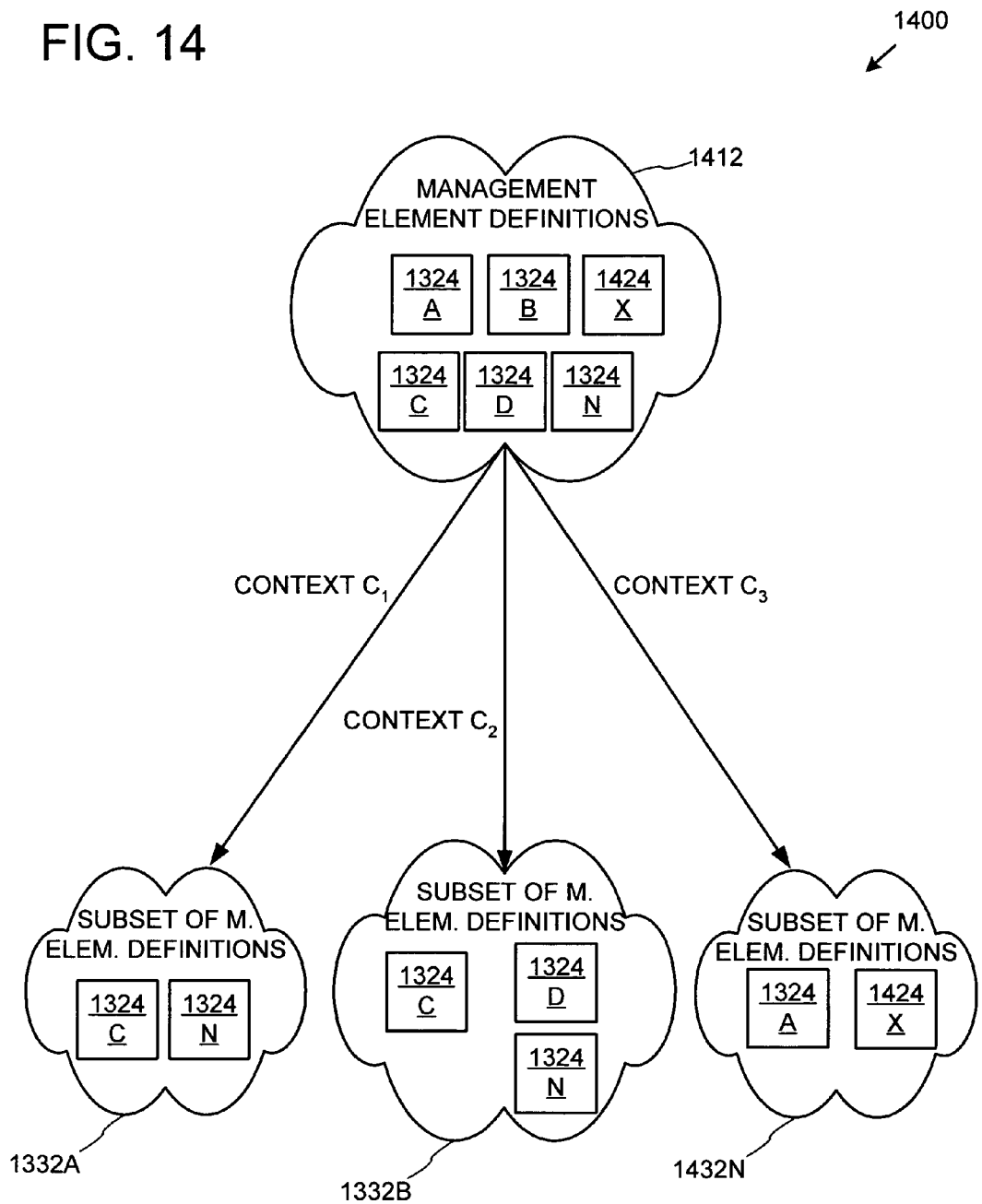
FIG. 14 is a block diagram illustrating how an added user interface element can propagate to appropriate user interfaces based on context without programming.

As shown in FIG. 14, a management element 1424X can be added to the management element definitions (e.g., definitions 1312) to generate a new set 1412. The new management element 1424X can include metadata indicating the appropriate contexts for which an associated user interface element is to be displayed. As a result, when the current context indicates that the user interface element is to be displayed (e.g., the third context in the example), the new management element 1424 will be included in the subset 1432N. Accordingly, when a user interface is rendered based on the definitions, a new respective user interface element will appear on the appropriate user interface surface.

In this way, user interface elements can be added to user interface surfaces without programming. Further, new user interface elements can be added even though the original developer of the software did not know of the existence of the user interface element developer or the feature implemented by the new user interface element.

Due to the dynamic (e.g., run time, context-based) nature of the described user interface generation, retroactive updating of user interface surfaces can be achieved. The definition for a user interface surface need not change to accommodate the new user interface elements. Similarly, a new user interface surface definition can be added, and it will result in old and new user interface elements being displayed as appropriate.

Example 15

Exemplary Roles

A context-based system can include an external context factor of role. Thus, the current context can include one or more roles, and a management element definition can specify appropriate roles (e.g., that it is to be chosen when specified roles are present in the current context).

A role typically indicates a user's responsibilities and related permitted functionality. For example, a role of "Senior Administrator" typically has more responsibilities than a "Junior Administrator." The current role can be included as part of the current context to limit those user interface elements chosen for display to those contemplated for the role.

Although roles can be used to limit those items chosen for display to those that the user is able to perform, they can also be used to simplify the complexity of a user interface surface based on the role the user is performing. For example, if a user wishes to manage web services, the user can assume an appropriate role (e.g., "Web services manager") to avoid being overwhelmed by user interface elements related to non-web services functionality, even though the user may have rights to perform other functions. In this way, useful user interfaces can be designed to better achieve user goals.

An association between roles and management element definitions can be stored and modified as appropriate. For example, metadata can indicate the roles for which the elements should be shown. When a management element is defined, appropriate roles can be indicated in the definition, but the roles can be changed by an administrator as desired.

For example, metadata for a management element definition can indicate that a respective user interface element is to be displayed only when a particular factor of the context is a particular value (e.g., when the role of a current user is "administrator") or when a combination of factors is present in the current context (e.g., when the role of a current user is "administrator" or "junior administrator" and an item of type "server" is selected in a user interface).

Roles can be supported and implemented by external software (e.g., an operating system or a directory service). Typically, the roles can be modified as desired. For example, a new role can be created and a limited number of management element definitions associated with the new role. In this way, a user in the role is presented with the limited number of user interface elements.

A role can be automatically assigned to a user when logging in, but it can be assigned in some other way (e.g., by selecting from a list of possible roles). A user may assume multiple roles if desired.

Example 16

Exemplary Management Item Types

The current context can include a context factor indicating one or more types of management items. For example, when a user selects a particular item on a user interface, the type of the item (or the type of the item it represents) can be added as a context factor to the current context. Or, a user interface surface can specify that a particular type be added to the current context. If desired, the current context can indicate not only one or more types but the source of the types (e.g., specified by a user or a user interface surface definition).

Management items can include any of a variety of abstract or real world items being managed (e.g., servers, workstations, routers, files, users, groups, shares, disks, printers or other peripherals, networks, and the like). If desired, the management items can be associated with programming objects of a particular system, such as the Microsoft®.Net™ framework or some other system.

Figure 15:
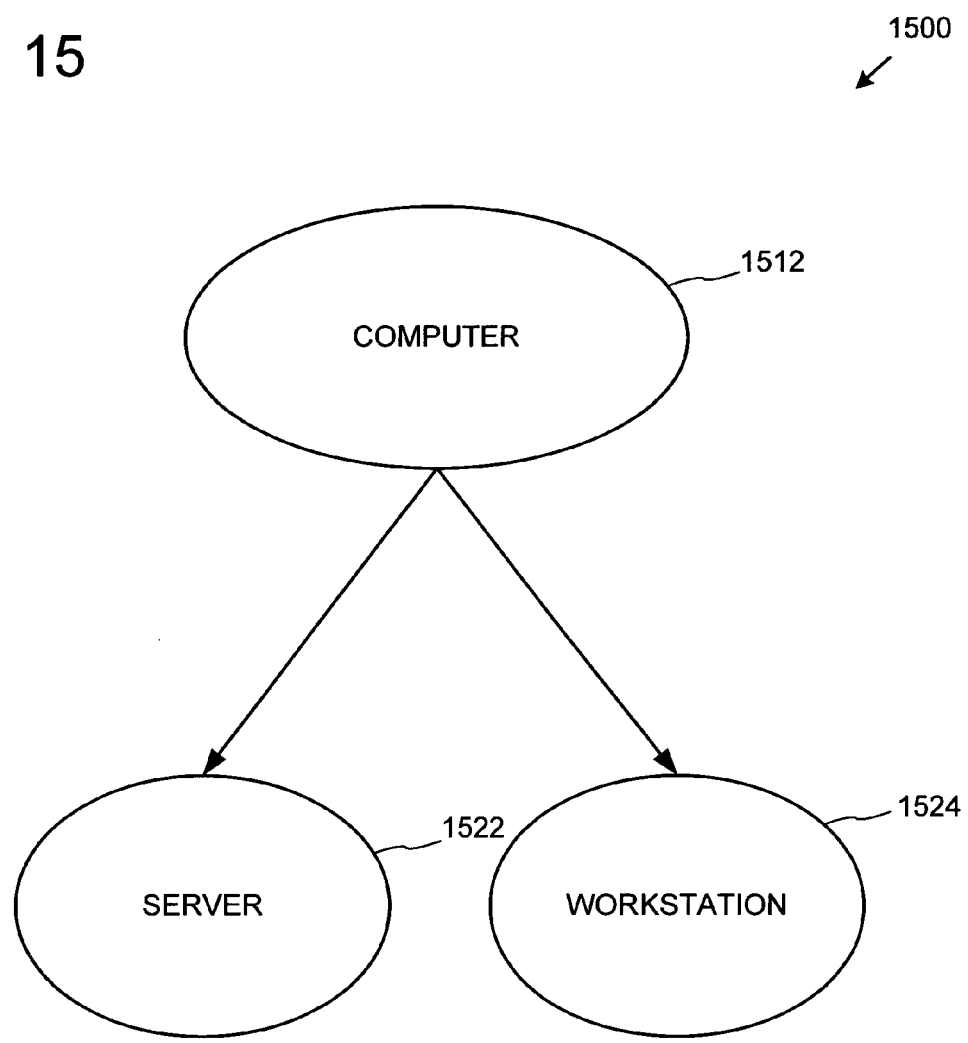
FIG. 15 is a block diagram showing an exemplary class hierarchy usable with context-based management element filtering.

Further, the objects can include hierarchical relationships. FIG. 15 shows an exemplary hierarchical relationship 1500 between management objects. In the example, a parent class computer 1512 has two children, server 1522 and workstation 1524. If desired, additional types can be added as children.

A filter filtering on the type of an object can handle such hierarchical relationships. For example, a filter that passes through a particular type can also allow child types to pass through; however, parent types can be filtered out (or vice versa).

In this way, functionality related to the computer type 1512 can be automatically provided for the new type. For example, if a type "mobile workstation" is added as a child (e.g., of 1524) and new user interface element definitions are added for mobile workstations (e.g., indicating a context of "mobile workstation"), user interfaces surface definitions can continue to provide appropriate functionality relating to the computer and workstation aspects of mobile workstations, but mobile workstation functionality will be presented only when the context indicates a mobile workstation.

For example, for a management element that is associated with a user interface element common to both server and workstation, the management element can be defined (e.g., via metadata) as appearing for the context "computer." But, if the management element is specific to the workstation, it can be defined as appearing for the context of "workstation" only; the filter will not present it if the context merely indicates "computer." Such an arrangement allows flexibility of specifying context generically or specifically.

Example 17

Additional Exemplary Management Item Types

The current context can represent additional situations relating to management item types. For example, heterogeneous or disparate management item types can be present in the current context (e.g., a user type and a file type can be in the current context). In this way, those user interface elements common to both types can be shown on a user interface surface (e.g., a delete button) when the items of the two types are selected. So, selection of items having heterogeneous types can be supported.

Further, the current context can indicate a number of items in homogeneous type selection. For example, the current context can indicate that exactly two of a particular type are in the current context (e.g., a user has selected two items of type server). In this way, those user interface elements associated with management elements specifying an appropriate type of "exactly two servers" or "an array of servers" (e.g., in metadata) would be selected for display. Combinations of heterogeneous and homogeneous types (e.g., exactly two users and a server) can be supported.

Example 18

Exemplary Categories

The current context can include one or more user interface element categories. Categories can be used to specify the type of management element (e.g., task, link, informational display, etc.). For example, a user interface surface may include zones with different categories. In this way, user interface elements associated with the management elements can be arranged within the surface based on category (e.g., different zones can have different categories).

Such an approach can provide a logical, predictable (e.g., function-based) arrangement of user interface elements on user interface surfaces, even if the exact user interface elements are not known when the user interface surface is defined. For example, as new user management element definitions including an appropriate category are added, their associated user interface elements will appear in the expected location in the user interface surface. One exemplary approach is to place user interface elements for management elements of category task in a zone, elements of category link in a different zone, and elements of category informational display in yet a different zone. However, any number of other approaches or different categories are possible.

Zone separation based on category can be accomplished by specifying the appropriate category as part of the current context for the zone defined in a user interface surface definition. When rendered, the user interface surface definition can have plural contexts (e.g., one for each zone).

Example 19

Exemplary Filtering Based on Plural Factors

Figure 16:
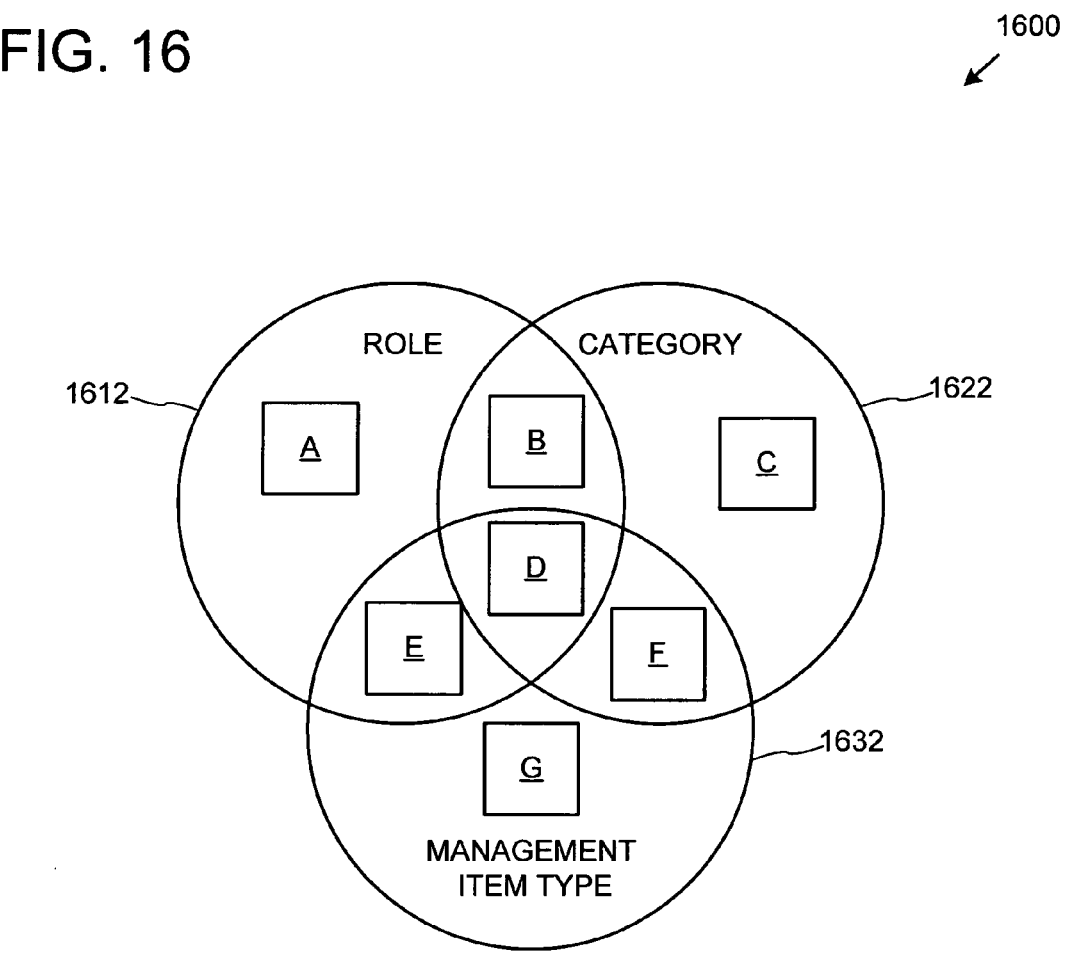
FIG. 16 is a Venn diagram showing an exemplary intersection of context factors.

FIG. 16 is a Venn diagram 1600 showing an exemplary intersection of context factors. In the example, the role of the current context results in a set 1612 of user interface element definitions, the category of the current context results in a set 1622 of user interface element definitions, and the management item type of the current context results in a set 1632 of user interface element definitions.

The intersection of the sets (e.g., element "D" in the example) are those chosen for display (e.g., in a zone of the user interface surface). In practice, the exact context of the separate sets need not be determined. For example, by using subtractive filtering, the subset becomes successively smaller, and all elements need not be repeatedly checked.

Example 20

Exemplary Tasks

The tasks that can be achieved via the user interface elements can include any of a variety of management tasks (e.g., delete, create, add, edit, reboot, ping, and the like). The tasks can be activated in a variety of ways (e.g., pressing a button, double clicking an item, and the like). The tasks can be initiated by management elements.

Figure 17:
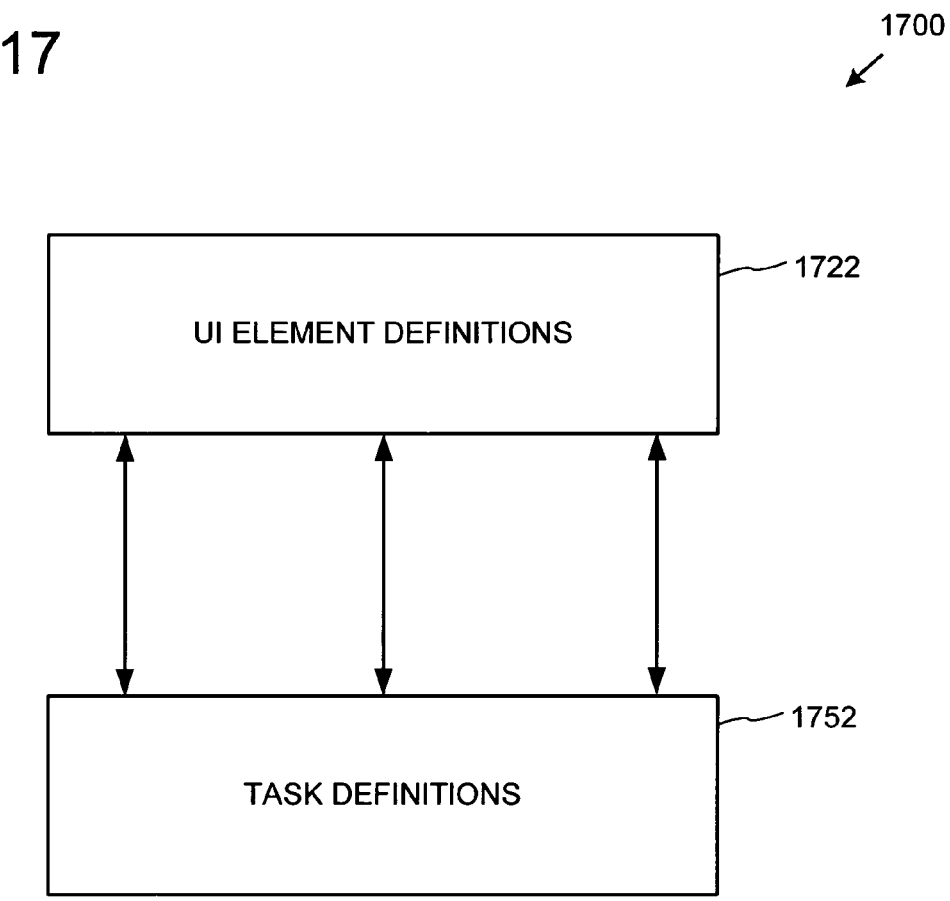
FIG. 17 is a block diagram showing an exemplary relationship between user interface element definitions and task definitions.

In order to decouple the tasks from the user interface element definitions, an arrangement such as the exemplary arrangement 1700 of FIG. 17 can be employed if desired. In the example, the user interface element definitions 1722 are decoupled from the task definitions 1752, but are related (e.g., in a many-to-many relationship). In this way, the task definitions 1752 (e.g., implemented as management element definitions) can be carried out by a system different from that rendering the user interface element definitions 1722. For example, a shell program may accept commands which are described by the task definitions 1752.

If desired, the task definitions may specify tasks to be carried out by a variety of software (e.g., software for managing users and software for managing networks). The user interface elements instantiated from the user interface elements and the objects for performing the tasks can communicate (e.g., via a messaging model).

The definitions for tasks can include the logic for accomplishing the task or a command for performing the tasks. The processing to perform the associated task can be performed by one or more systems external to the user interface presenter. In this way, the user interface can conceal the differences between underlying software. Such an approach can provide a seamless combination of different underlying software (e.g., the user does not need to jump back and forth or navigate in and out of software to execute related tasks in two different systems, such as a file system and a directory service.)

Example 21

Exemplary Links

In any of the examples described herein, a link can be used to navigate to another user interface surface. For example, a link displayed for a first user interface surface can be activated (e.g., clicked on by a user) to navigate to another user interface surface (e.g., defined by a user interface surface definition associated with the link).

By convention, links can be denoted by underlining. However, another convention or mixture of conventions can be supported.

A user interface surface can be persisted for later loading. Thus, a management element can cause another user interface surface to be presented by loading it.

Example 22

Exemplary Informational Display

In any of the examples described herein, informational displays can be used to present information about a variety of resources. Selections from the informational displays can be performed by a user and can affect the current context. For example, if a user selects an item of a particular type, the type can be added to the current context.

Informational displays can scale to the available screen real estate if desired. For example, an informational display indicating server performance may be a small dot on a small user interface surface but indicate considerable more detail when presented on a large user interface surface. In this way, the same user interface element definition can be used for a variety of surfaces if desired.

Data within informational displays can be filtered by a data filter. For example, a filter can take out entries (e.g., servers) not to be shown (e.g., based on server state or role).

Example 23

Exemplary Metadata for User Interface Elements Specifying Types

As described herein, metadata can be associated with a management element to indicate appropriate inputs for the associated user interface element (e.g., if a task is associated therewith). The metadata can indicate the appropriate types for a task. Any of the management item type factors described herein can be specified via the metadata. For example, heterogeneous or homogeneous specification of types, exact number, array of types, and the like can be supported. In addition, the metadata can specify that the type is deferred (e.g., sometimes called "optional").

In the case of a deferred type, the type is eventually expected, but the user interface element will be chosen for display even if the deferred type is not present in the current context.

Example 24

Exemplary User Interface Surface Definitions

A variety of approaches can be used to define a user interface surface. For example, a codeless approach can specify a definition via a markup language, such as XML.

The user interface surface can specify certain user interface elements are to appear based on the current context (e.g., they dynamically change based on context), while others are to appear regardless of context. One approach is to specify a plurality of zones within the user interface surface, with each zone having an associated category which is contributed to the current context. Thus, user interface elements are arranged in the zones by category (e.g., user interface elements for tasks in one zone, informational displays in another zone, and links in another zone). No executable code need be written to specify such a user interface surface.

It is possible to string together user interface surface definitions (e.g., via links from one surface to another). Any number of arrangements are possible. For example, a front end for a command line interface can be assembled from a variety of user interface surfaces that eventually invoke the command line via a task.

Example 25

Exemplary Combination of Management Elements

Various management elements designed by different parties can be integrated into a single chain of surfaces for the user. For example, a developer of directory services can define management elements for tasks that allow addition and deletion of users from the directory. Separately, a developer of email services can define management elements for tasks that add and delete mailboxes for a user. A developer of file systems can define management elements for tasks that add and remove file shares. The management elements can have associated user interface element definitions.

Subsequently, an administrator can link the three together to provide a series of surfaces representing a workflow (e.g., connected by "next links") for a help desk operator. When a new user needs to be added to the system, the help desk operator first adds the user to the directory, clicks next, creates a mailbox, clicks next, and assigns shares. In this way, the tasks typically performed together can be easily linked together for presentation to the user.

Example 26

Exemplary Management Elements

The management elements described herein can include the definitions for accomplishing tasks and be associated with a user interface element definition. For example, a management element might include logic for collecting information for display in the user interface element. Such logic may perform appropriate queries to collect the information. If desired, such logic can collect information once or continually (e.g., to provide continuous updating of displayed information). The management element can communicate with the user interface element via a messaging model.

For example, when an appropriate message is sent to the management element, it can perform a particular task. If desired, the management elements and the user interface elements can be implemented as programming objects (e.g., instances of a particular programmer-defined class) according to the principles of object-oriented programming.

Example 27

Exemplary Determination of Types of Management Items

In some cases, a group of objects may appear to be of the same type, even though they represent objects of different types. In such cases, it may be desirable to inspect properties of the objects to find an appropriate type. For example, network management software may represent users and servers via the same type (e.g., an object class), but the instance of the object representing the item may contain a field indicating what the object represents (e.g., a user or a server). The determined type can be used to more accurately represent the current context.

Example 28

Exemplary Navigation between Surfaces

Figure 18:
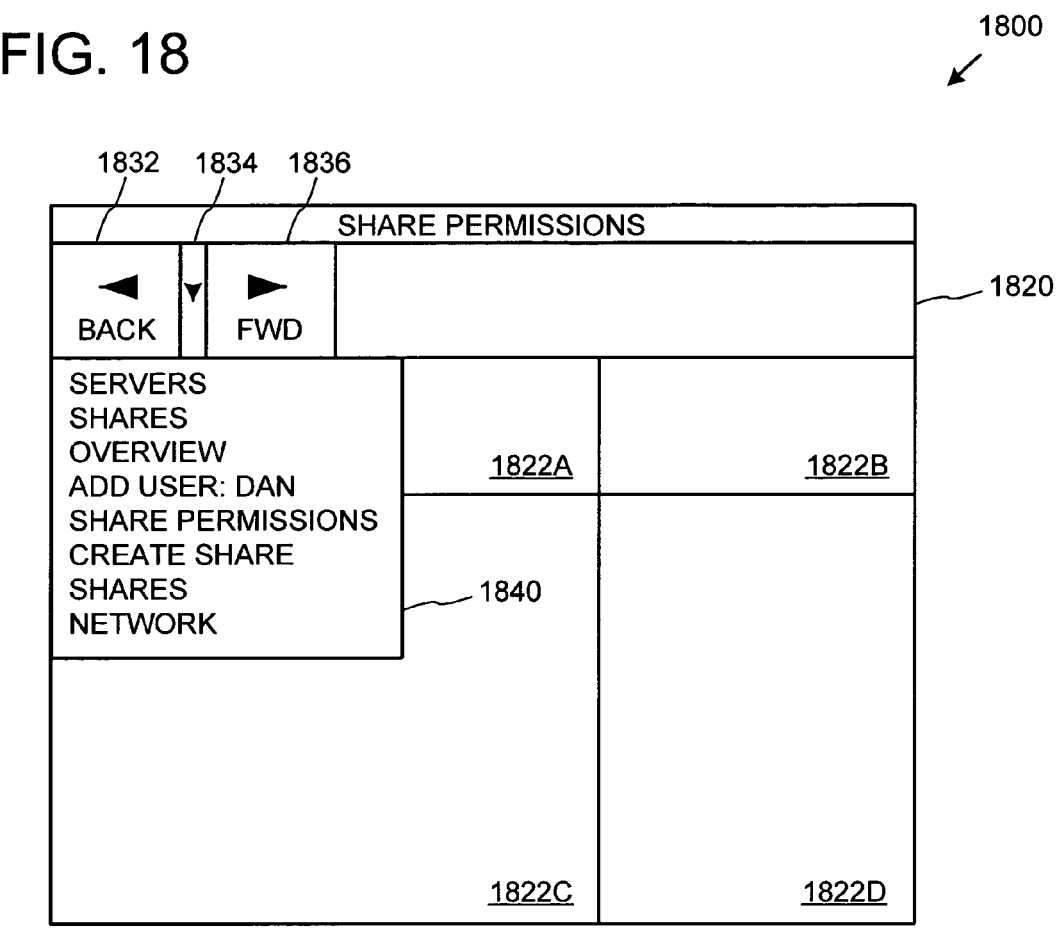
FIG. 18 is a screenshot showing an exemplary user interface for navigating among management user interface surfaces.

In any of the examples herein, a navigational model supporting navigation within a navigation history can be supported. For example, FIG. 18 shows an exemplary user interface 1800 supporting navigation within a navigation history.

As the user navigates between user interface surfaces, an indication of the surfaces can be stored in a history for later recall. In the example, a back button 1832 navigates to the previous user interface surface, and a forward button 1836 can navigate to the next user interface surface in a navigation history.

Further, a list 1840 of the history can be presented (e.g., upon activation of the button 1834) so that a user can choose from the listed user interface surfaces. Such an approach is sometimes called "leaving breadcrumbs" because a trail of the user can be reconstructed via information stored indicating the user's navigation history.

Example 29

Exemplary Extensible Nature

In any of the examples herein, the technologies can be engineered for extensibility. For example, context-based user interface element definition filtering can be performed at run time. Additional user interface element definitions can be added to the store on an ongoing basis (e.g., after the software is shipped). The user interface presented by the software can be modified by modifying the user interface element definitions or the user interface surface definitions.

Further, additional categories, roles, and management item types can be added to the system on an ongoing basis without reprogramming. If desired, additional factors can be added to the context (e.g., user interface elements can be defined to appear only when such factors are present, and user interface surface definitions can include such factors in the current context).

Also, filters can be added to the system on an ongoing basis without reprogramming. Such filters can perform any arbitrary filtering functionality and can make use of the current context to achieve subtractive filtering.

Example 30

Exemplary Filter Addition and Discovery

The subset of management elements can be determined by a query on the store of management element definitions. Filters can be added so that filtering takes place at a particular stage of the subtractive filtering. For example, the system's runtime configuration can indicate that a filter can occur before the management element store is queried for appropriate elements. Filters can be associated with the store itself to introduce filtering after store queries. Finally, the filter can be associated with an interface surface definition itself to cause filters to be loaded for the scope of the user interface surface. An administrator of the system can register filters with the software to add them.

Example 31

Exemplary Element Store

The element store can take many forms. For example, a tool can be provided by which new user interface definitions are registered on a particular computer, and the definitions can be associated with tasks or management elements. The store can be codeless in that no code need be stored in the store to determine when and how to render the user interface elements.

Example 32

Exemplary Computer System

Any of the exemplary systems described herein can be implemented by software running on a computer system, such as a general purpose programmable computer, including microprocessor-based systems running any of a variety of operating systems, including the Microsoft® Windows® operating system and others. Such computer systems can include or work in conjunction with computer-readable media, such as RAM, ROM, hard disks, CD-ROM, DVD-RAM, and the like.

Example 33

Exemplary Computer-Executable Instructions

Any of the exemplary methods described herein can be implemented by software comprising computer-executable instructions, which can be stored in computer-readable media.

Example 34

Exemplary Application for Managing Network Resources

The technologies described herein can be used to construct a centralized console for managing network resources via a plurality of underlying applications. For example, a context-based, extensible version of the Microsoft® Management Console ("MMC") of Microsoft Corporation of Redmond, Wash. can be constructed via the technologies described herein.

Figure 19:
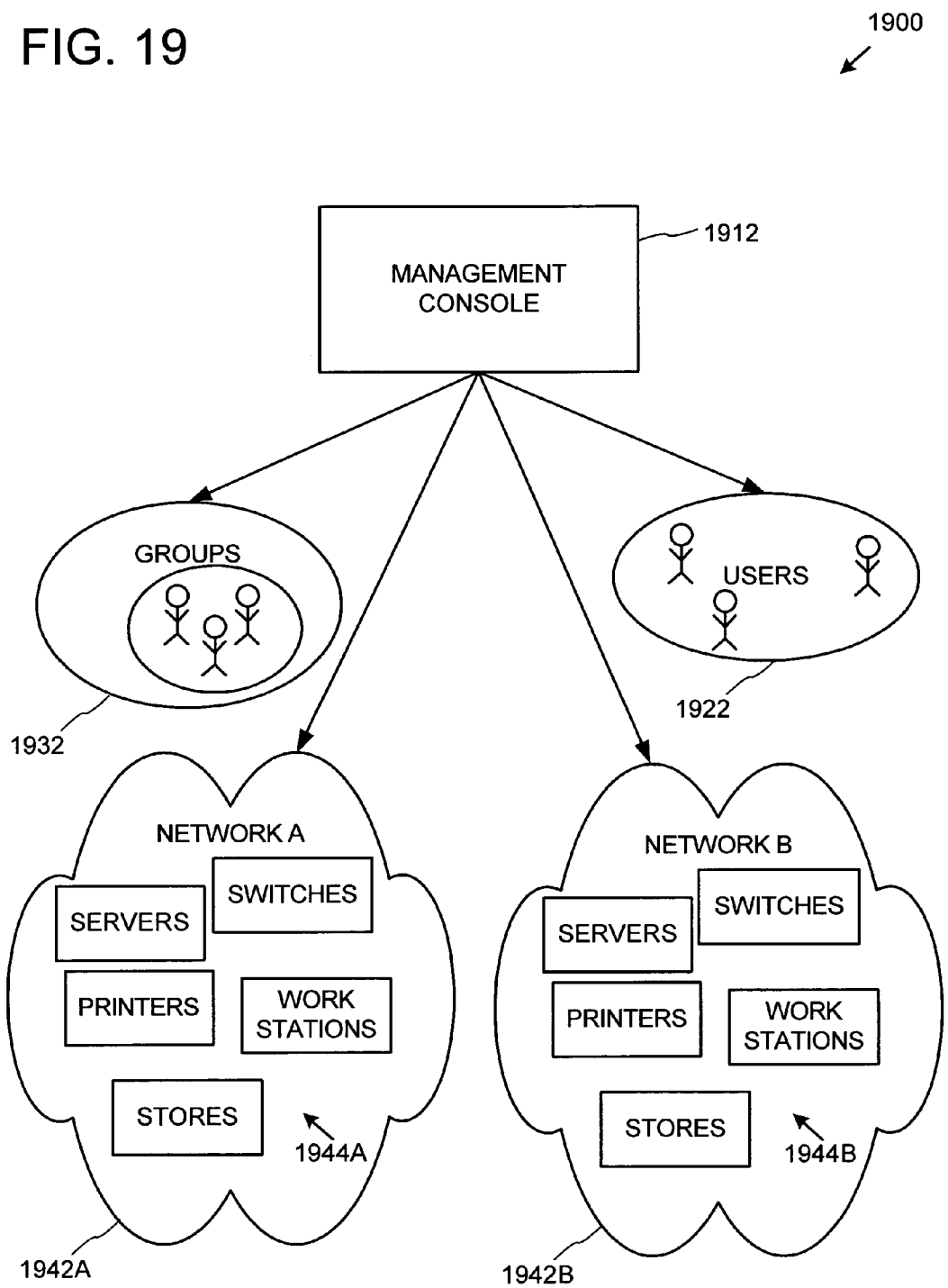
FIG. 19 is a block diagram showing an exemplary centralized management console for managing network resources.

FIG. 19 shows a system 1900 including an exemplary centralized management console 1912. The console 1912 presents user interfaces for managing resources such as the list of users 1922, the list of groups 1932, and networks 1942A and 1942B, which include various network resources 1944A and 1944B.

The software used to manage the resources can include a collection of interrelated or separate software. For example, Microsoft® Active Directory® ("AD") directory service and Microsoft® Domain Name System ("DNS") Software can be used in conjunction with other software. User interface elements appearing on the management console 1912 can be used to invoke tasks that in turn invoke the proper software to achieve the task. The user need not be aware of which software is performing the task.

Example 35

Exemplary Execution

FIGS. 20-23 show exemplary user interface surfaces for presenting a centralized management console for managing network resources. The user interface surfaces can be generated using the context-based technologies described herein.

Figure 20:
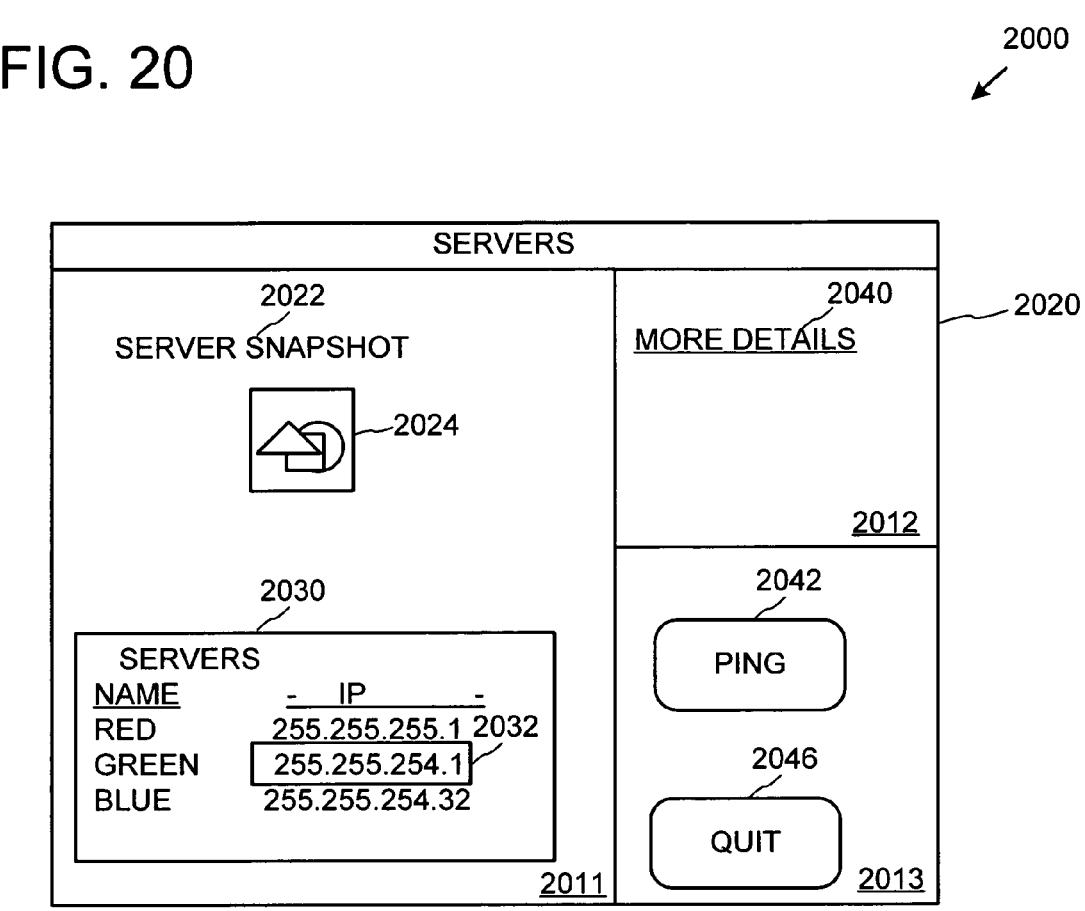
FIG. 20 is a screenshot showing an exemplary user interface for presenting information about network servers.

FIG. 20 shows a user interface surface 2000 including a window 2020 divided into three zones 2011, 2012, and 2013, showing user interface elements appropriate for categories of informational display, links, and tasks, respectively. The definition of the user interface surface 2000 indicates that user interface elements presenting a server snapshot 2022 (e.g., including a graphic 2024) be shown along with a list of servers 2030. In addition, the zone 2013 is defined so that the quit user interface element 2046 shows up regardless of context.

Because a user has clicked on the IP address 2032 of one of the displayed servers, the current context includes "IP address." Accordingly, the user interface element listed in the tasks zone 2013 includes a pushbutton 2042 for performing a ping command on the IP address (e.g., the metadata for the management element associated with the pushbutton 2042 indicates that it is to be displayed when the current context includes a user selection of a management item of type "IP address." Further, a more details link 2040 is shown in the links zone 2012.

Figure 21:
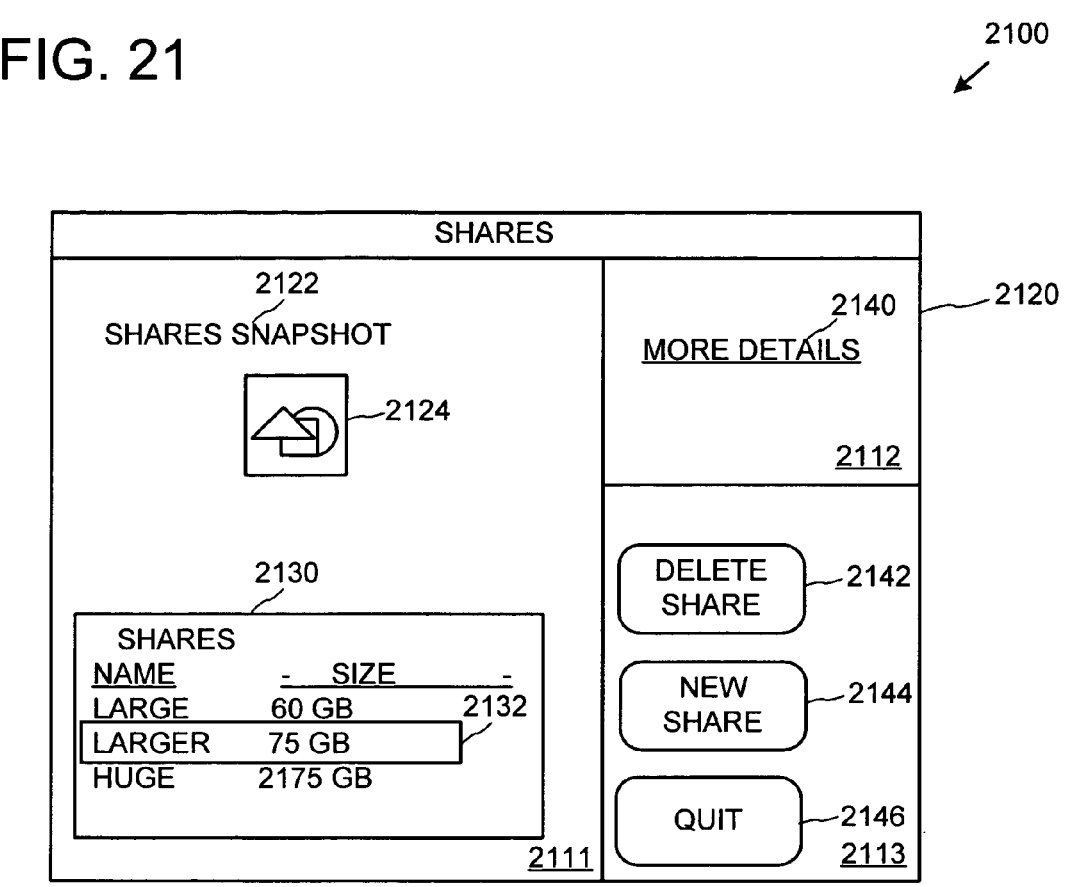
FIG. 21 is a screenshot showing an exemplary user interface for presenting information about shares.

FIG. 21 shows another user interface surface 2100 including a window 2120 divided into three zones 2111, 2112, and 2113, showing user interface elements appropriate for categories of informational display, links, and tasks, respectively.

The user interface surface has been defined to display the shares snapshot 2122 and 2124 along with a list of shares 2130. The quit button 2146 is defined to appear regardless of context.

In the example, a user has selected one of the shares named "larger" 2132. Accordingly, a management item type of "share" is added to the current context. As a result, the user interface element 2140 appears in the link zone 2112, and appropriate user interface elements 2142 and 2144 for executing tasks related to the share appear in the tasks zone 2113.

User activation of the graphical button 2142 will result in execution of a delete share task associated with the user interface element; the task will be provided with information about the share "larger" (e.g., in accordance with metadata of the management element) so that the share can be deleted. A warning dialog box can be displayed if desired.

Figure 22:
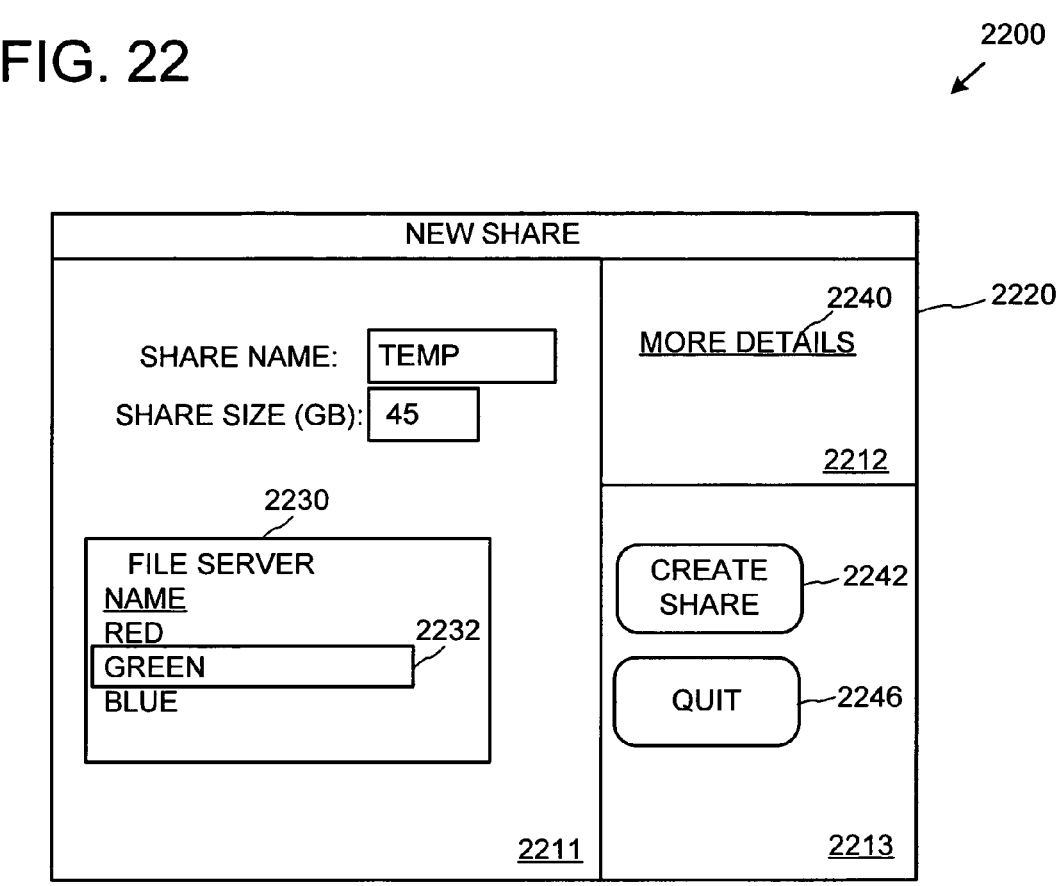
FIG. 22 is a screenshot showing an exemplary user interface for collecting information about a new share.

Upon activation of the graphical button 2144 for creating a new share, a graphical user interface surface for creating a new share can be shown, such as that of FIG. 22.

FIG. 22 shows another user interface surface 2200 including a window 2220 divided into three zones 2211, 2212, and 2213, showing user interface elements appropriate for categories of informational display, links, and tasks, respectively.

The user interface surface 2200 has been defined to display the appropriate user interface elements for creating a share, including a list of file servers 2230. The quit button 2246 is defined to appear regardless of context.

In the example, a user has selected one of the file servers named "green" 2232. Accordingly, a management item type of "file server" is added to the current context.

As a result, the user interface element 2140 appears in the link zone 2112, and an appropriate user interface element 2142 for creating the share appears in the tasks zone 2113.

Figure 23:
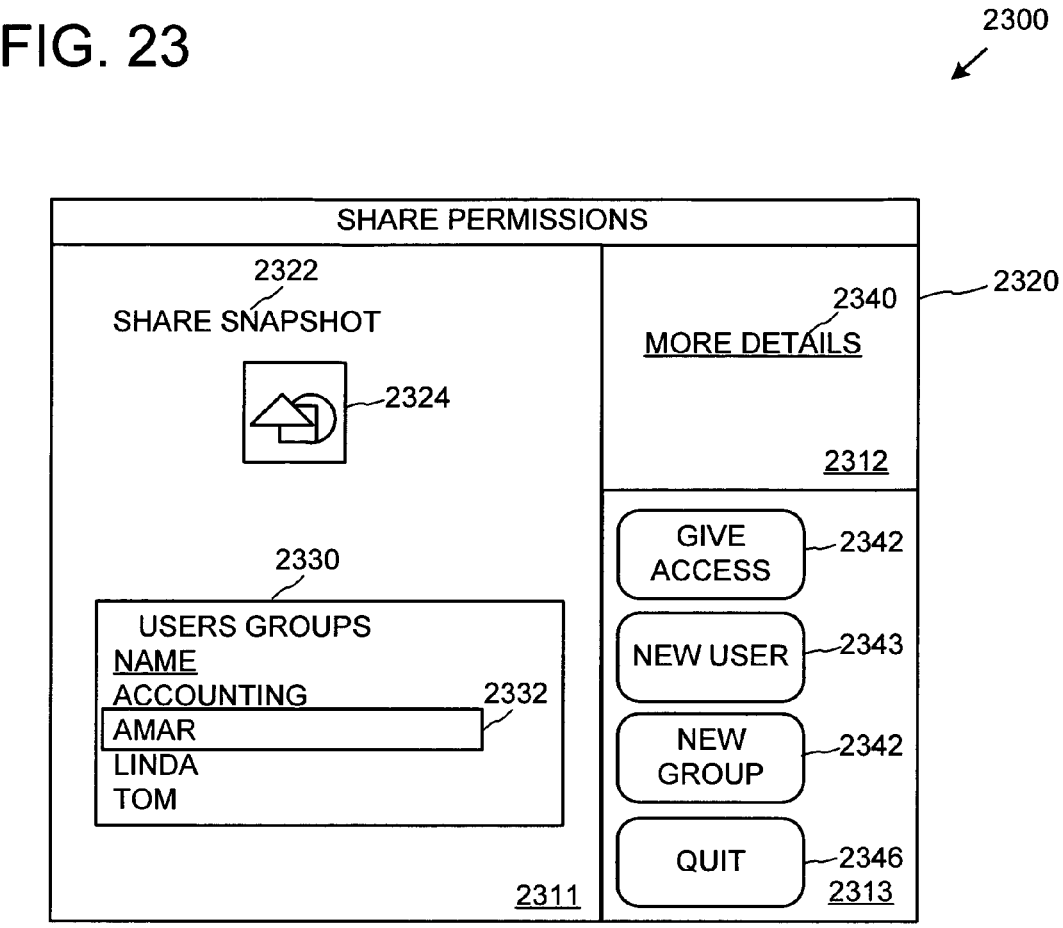
FIG. 23 is a screenshot showing an exemplary user interface for collecting information about share permissions.

Upon activation of the graphical button 2142 for creating a new share, the share can be created (e.g., by an appropriate tasks), and a graphical user interface surface for assigning permissions to the share can be shown, such as that of FIG. 23.

FIG. 23 shows another user interface surface 2300 including a window 2320 divided into three zones 2311, 2312, and 2313, showing user interface elements appropriate for categories of informational display, links, and tasks, respectively.

The user interface surface 2300 has been defined to display the appropriate user interface elements for assigning permissions to a share, including snapshot of the share 2322 and 2324 and a list of users and groups 2330. The quit button 2346 is defined to appear regardless of context.

In the example, a user has selected one of the users named "Amar" 2332. Accordingly, a management item type of "user" is added to the current context. As a result, the user interface element 2340 appears in the link zone 2112, and an appropriate user interface element 2142 for giving the user access to the share appears in the tasks zone 2113.

Upon activation of the graphical button 2142 for giving the user access, the user is given access (e.g., by an appropriate tasks).

In addition, user interface elements for creating a new user 2343 and a new group 2342 can also be presented in the tasks zone 2313. In this way, the user need not navigate to a different user interface to create a new user, even if the software for creating users is different from that for assigning share permissions.

A management element can also be associated with a particular user interface surface definition so that it comes up only for the particular user interface surface. For example, it may be desirable to customize the "add user" surface to present a user interface element for collecting the user's telephone number. Such an arrangement can be accomplished by creating a management element that indicates that it is to be displayed for only certain user interface surfaces. A filter can remove the management element for other user interface surfaces.

Various enhancements and other modifications can be made to any of the exemplary user interface surfaces shown. In addition, by default a first element of a list may be selected and the current context updated appropriately, rather than awaiting user selection of an item.

Example 36

Exemplary Enhancement Involving Trouble Ticket Software

Many enhancements to network management software can be accomplished via a context-based approach. For example, in network management software related to monitoring problems in a network, trouble ticket functionality can be added without having to reprogram the user interface.

For example, a user interface element for creating a trouble ticket can be defined to appear when the context is appropriate (e.g., when there is a problem with a server, a router, a printer, or the like). Upon activating the user interface element (e.g., a pushbutton), additional information can be collected via user interface surfaces that have been defined without reprogramming the current user interface. For example, the user interface surfaces can collect an email address and a textual description of the problem. Upon activation of an appropriate user interface element (e.g. a submit button), the trouble ticket software can create the trouble ticket, which can be tracked or managed as appropriate.

Alternatives

The technologies described in any of the examples can be combined with technologies from one or more of the other examples. In view of the many possible embodiments to which the principles of the invention may be applied, it should be recognized that the illustrated embodiments are examples of the invention, and should not be taken as a limitation on the scope of the invention. Rather, the scope of the invention includes what is covered by the following claims. We therefore claim as our invention all that comes within the scope and spirit of these claims.

We claim:

1. One or more tangible computer-readable media having computer-executable instructions for performing a method to determine one or more user interface elements to display for a user interface surface, the method comprising:
   receiving a definition of the user interface surface;
   receiving an indication of a current context with multiple current context factors, each current context factor having a possible set of management element definitions with an associated set of user interface element definitions for presentation on the user interface surface, wherein the possible sets of management element definitions comprise logic for retrieving data to be displayed on the user interface surface determining an intersection of the associated sets of user interface element definitions as a display set of user interface element definitions, the determining the intersection comprising,
      applying a first subtractive filter before querying a management element store for one or more interface elements,
      applying a second subtractive filter after querying the management element store, the second subtractive filter being associated with the management element store, and
      applying a third subtractive filter after receiving the definition of the user interface surface, the third subtractive filter being associated with the definition of the user interface surface; and
   displaying at least a portion of the display set of user interface element definitions on the user interface surface using the logic for retrieving data to be displayed on the user interface surface of the sets of management element definitions associated with the user interface element definitions.

2. The one or more tangible computer-readable media of claim 1 further comprising:

registering a new filter to be added to the subtractive filters.

3. The one or more tangible computer-readable media of claim 2 wherein the new filter filters on a context factor not recognized before adding the new filter.

4. The one or more tangible computer-readable media of claim 1 wherein:

the indication of the current context is based at least on a context factor contributed by a management element definition associated with a user interface element.

5. The one or more tangible computer-readable media of claim 1 wherein:

the indication of the current context is based at least on a state of an application presenting the user interface surface.

6. The one or more tangible computer-readable media of claim 1 wherein:

the indication of the current context is based at least on a context factor indicating a type of an item selected by a user.

7. The one or more tangible computer-readable media of claim 1 wherein:

the indication of the current context is based at least on an external context factor.

8. The one or more tangible computer-readable media of claim 1 wherein:

the indication of the current context is based at least on a context factor contributed by the definition of the user interface surface.

9. The one or more tangible computer-readable media of claim 1 wherein:

metadata associated with at least one of the management element definitions indicates a category factor associated with at least one user interface element definition, whereby the at least one of the management element definitions is chosen based on a presence of the category factor in the current context.

10. The one or more tangible computer-readable media of claim 1 wherein:

metadata associated with at least one of the management element definitions comprises a management item type factor, whereby the at least one of the management element definitions is chosen based on a presence of the management item type factor in the current context.

11. The one or more tangible computer-readable media of claim 10 wherein:

the choosing supports a presence of heterogeneous management item types in the current context.

12. The one or more tangible computer-readable media of claim 11 wherein:

the presence of heterogeneous management item types in the current context results from selection of items in a user interface representing items of heterogeneous management item types.

13. The one or more tangible computer-readable media of claim 10 wherein:

the choosing supports the presence of an exact number of items of a management item type in the current context.

14. The one or more tangible computer-readable media of claim 10 wherein:

the choosing is performed at runtime of software presenting the user interface surface.

15. The one or more tangible computer-readable media of claim 1 wherein:

the possible set of user interface element definitions is operable to receive at least one additional user interface element definition non-programmatically, wherein the additional user interface element definition includes an indication of an appropriate context for determining whether the additional user interface element definition is to be chosen for display within the current context.

16. The one or more tangible computer-readable media of claim 1 wherein the definition of the user interface surface indicates one or more factors to be included in the current context.

17. The one or more tangible computer-readable media of claim 1 wherein:

the user interface surface comprises a plurality of different zones; and the current context is based upon the definition of a zone within the user interface surface, the current context being different for the different zones of the user interface surface.

18. The one or more tangible computer-readable media of claim 1 wherein the current context includes one or more of the following factors affecting which user interface element definitions are chosen for display: a user role factor, a management item type factor, and a category factor.

19. The one or more tangible computer-readable media of claim 1 wherein the user interface surface is defined according to an XML schema operable to specify one or more context factors to limit the display of user interface elements in the user interface surface.

20. The one or more tangible computer-readable media of claim 1 wherein the user interface surface comprises at least one link activatable to navigate to another user interface surface.

21. The one or more tangible computer-readable media of claim 20 wherein the method further comprises:

storing an indication of the user interface surface in a navigation history.

22. A method of processing definitions of user interface elements at runtime of a management user interface, the method comprising:

receiving a definition of a management user interface surface comprising a plurality of zones, at least two of the zones having different respective categories specified therefor;

determining a user role of a current user;

determining at least one user selection from the management user interface;

for respective zones of the plurality of zones of the management user interface surface, determining a current context using the user role and the at least one user selection from the management user interface;

applying a first filter for filtering management-related user interface element definitions before a query to a store of management-related user interface element definitions;

for the respective zones of the plurality of zones, applying a second filter for filtering management-related user interface element definitions after querying the store of management-related user interface element definitions, the second filter being associated with the store of management-related user interface element definitions; and applying a third filter for filtering management-related user interface element definitions after receiving the definition of the management user interface surface, the third filter being associated with the definition of the management user interface surface;

wherein the filtering of the first, second, and third filters is based upon the current context of a given zone to produce filtered management-related user interface element definitions, the user interface element definitions comprising trouble ticket functionality for a managed item; and rendering, in the respective zones of the plurality of zones of the management user interface surface, management-related user interface elements according to the filtered management-related user interface element definitions chosen based upon the current context for the respective zones and using logic contained in one or more management element definitions associated with the filtered management-related user interface element definitions;

wherein the store of management-related user interface element definitions is codeless such that no code need be stored in the store to determine when and how to render the management-related user interface elements.

23. A computer system comprising:
a display;
a central processing unit;
computer memory;
a user interface service stored in computer memory and executable using the central processing unit, the user interface service comprising:
  a set of management element definitions, the management element definitions comprising respective metadata indications comparable against a current context to determine whether a respective user interface element definition is to be chosen for display and further comprising logic for retrieving data to be displayed, the respective user interface element definition comprising trouble ticket functionality for a managed item; and
  a first management element definition context-based filter operable to filter before a query to a management element store;
  a second management element definition context-based filter operable to filter after a query to the management element store, the second management element definition context-based filter being associated with the management element store;
  a third management element definition context-based filter operable to filter after receiving a definition of a user interface surface, the third management element definition context-based filter being associated with the definition of the user interface surface;
wherein the first, second, and third management element definition context-based filters are further operable to compare the current context against the respective metadata indications of the set of management element definitions to determine whether the respective user interface element definition is to be chosen for display;
wherein the user interface service supports a hierarchy of user element definition types and wherein the first, second, and third management element definition context-based filters are operable to filter out parent user element types while allowing child user element types to pass through for display.

24. The computer system of claim 23 further comprising:
a user interface presenter for presenting user interface elements based on the management element definitions chosen by the first, second, and third management element definition context-based filters.

25. The computer system of claim 23 wherein the current context is determined at least in part based on a type associated with an item selected by a user.

26. The computer system of claim 23 wherein the system supports selection of heterogeneous types.

27. The computer system of claim 23 wherein the system supports type filtering for a hierarchy of types.

28. A computer system comprising:
a display;
a central processing unit;
computer memory having computer-executable instructions for performing a method, the method comprising:
receiving definitions of at least two user interface surfaces;
associating filters with the interface surface definitions;
defining a set of management elements, the defining comprising a respective appropriate indication comparable against a current context to determine whether a respective user interface element is to be chosen for display;
loading the associated filters with their interface surface definitions;
filtering the set of management elements, wherein the filtering comprises using the loaded filters for the associated interface surfaces to compare the current context of each associated interface surface against the respective indications of the management elements to determine whether the respective user interface element is to be chosen for display, wherein at least one respective indication of the management elements comprises a user role factor comprising at least one user responsibility out of a plurality of responsibilities and at least one permitted user functionality;
wherein the filtering further comprises:
  applying a first subtractive filter before querying a management element store;
  applying a second subtractive filter after querying the management element store, the second subtractive filter being associated with the management element store; and
  applying a third subtractive filter after receiving at least one of the interface surface definitions, the third subtractive filter being associated with at least one of the interface surface definitions; and
displaying, using logic defined in one or more management element definitions, one or more respective user interface elements chosen for display, the one or more respective elements chosen for display comprising a user interface element for creating a trouble ticket.

29. The one or more tangible computer-readable media of claim 1, further having encoded thereon a data structure for defining a management element and an associated user interface element to be selectively shown according to the current context with at least one current context factor, wherein the data structure is loadable into a user interface system, the data structure comprising:
a reference to one or more definitions of one or more visual user interface elements to be presented on the user interface surface;
a definition of a task to be performed when the one or more visual user interface elements are activated;
a description of a first set of logic in the management element for retrieving data to be presented on the user interface surface;
a description of a second set of logic in the management element for initiating execution of the defined task to be performed; and
metadata indicating a context comprising context factors against which the current context can be compared at runtime of the user interface system to determine whether the user interface element is to be shown, the metadata indicating at least one user responsibility out of a plurality of responsibilities and at least one permitted user functionality, wherein the context factors contribute to the context and include application state, external state, and management elements, the context factors comprising a problem status of a managed item.

30. The one or more tangible computer-readable media of claim 1, further having encoded thereon a data structure for defining the user interface surface having elements to be selectively shown according to the current context, wherein the data structure is loadable into a user interface system, the data structure comprising:
- a definition of one or more user interface zones for the user interface surface;
- at least two specifications of context factors to be included in the current context when filtering user interface elements to be shown at runtime of the user interface system, wherein at least one of the context factors is a problem status of a managed item; and
- at least two sets of user interface element definitions associated with the context factors, wherein one of the sets of user interface element definitions comprises trouble ticket functionality for the managed item, and wherein only the user interface element definitions that occur in each of the sets of user interface element definitions are selected to be shown according to the current context and using one or more management element definitions comprising logic for retrieving data to be displayed on the user interface surface.

31. The one or more tangible computer-readable media of claim 30 wherein at least one of the context factors is at least one of following: a role of the current user, a type of a management item, and a category.

32. The one or more tangible computer-readable media of claim 30 wherein at least one of the context factors is a management item type of at least one of following: a network server, a network workstation, a network user, and a network share.

33. The one or more tangible computer-readable media of claim 30 wherein the user interface surface is defined via XML.

34. The one or more tangible computer-readable media of claim 1, wherein at least one definition within the set of possible management element definitions includes logic for retrieving data to be displayed, and logic for initiating execution of a selected task.

35. The computer system of claim 23 wherein the first management element definition context-based filter is operable to filter out child types while allowing parent types to pass through.

* * * * *